(12) United States Patent
Bergquist et al.

(10) Patent No.: US 11,516,854 B2
(45) Date of Patent: *Nov. 29, 2022

(54) METHODS AND APPARATUS SUPPORTING RANDOM ACCESS PROCEDURES IN A WIRELESS NETWORK

(71) Applicant: Telefonaktiebolaget LM Ericsson (publ), Stockholm (SE)

(72) Inventors: Gunnar Bergquist, Kista (SE); Jan Christoffersson, Luleå (SE); Mats Folke, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/154,212

(22) Filed: Jan. 21, 2021

(65) Prior Publication Data

US 2021/0144774 A1    May 13, 2021

Related U.S. Application Data

(63) Continuation of application No. 16/329,258, filed as application No. PCT/SE2018/051358 on Dec. 21, 2018, now Pat. No. 10,945,291.

(Continued)

(51) Int. Cl.
*H04W 4/00*    (2018.01)
*H04W 74/08*    (2009.01)
(Continued)

(52) U.S. Cl.
CPC ..... *H04W 74/0833* (2013.01); *H04W 52/365* (2013.01); *H04W 76/27* (2018.02); *H04W 80/02* (2013.01)

(58) Field of Classification Search
CPC ... H04W 76/27; H04W 52/365; H04W 80/02; H04W 74/0833
See application file for complete search history.

(56) References Cited

U.S. PATENT DOCUMENTS

| 2009/0163211 A1 | 6/2009 | Kitazoe et al. |
| 2017/0013610 A1 | 1/2017 | Lee et al. |

(Continued)

FOREIGN PATENT DOCUMENTS

| CN | 103457873 B | 6/2017 |
| JP | 2011508538 A | 3/2011 |

(Continued)

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.0.0, Dec. 2017, 1-55.

(Continued)

*Primary Examiner* — Abdelnabi O Musa
(74) *Attorney, Agent, or Firm* — Murphy, Bilak & Homiller, PLLC

(57) ABSTRACT

A method performed by a wireless device is described herein. The wireless device operates in a wireless communications network. The wireless device provides a message to be sent to a network node operating in the wireless communications network. The message is a first scheduled message to be sent to the network node in a random access procedure. The message comprises a first indicator of a type of the message. The type of message has: a) a fixed size SDU, and b) a one byte header comprising the first indicator and lacking a second indicator of a length of a payload. The wireless device also initiates sending the provided message to the network node. Also described is a method performed (Continued)

by the network node receiving and initiating processing the message, based on the first indicator.

18 Claims, 14 Drawing Sheets

Related U.S. Application Data

(60) Provisional application No. 62/630,886, filed on Feb. 15, 2018.

(51) Int. Cl.
*H04W 76/27* (2018.01)
*H04W 52/36* (2009.01)
*H04W 80/02* (2009.01)

(56) References Cited

U.S. PATENT DOCUMENTS

| | | | |
|---|---|---|---|
| 2017/0195464 A1* | 7/2017 | Lee | H04W 52/365 |
| 2017/0331577 A1 | 11/2017 | Parkvall et al. | |
| 2018/0324869 A1* | 11/2018 | Phuyal | H04W 72/14 |
| 2019/0124715 A1* | 4/2019 | Chen | H04W 76/11 |
| 2019/0254114 A1* | 8/2019 | Son | H04L 5/001 |
| 2020/0137776 A1* | 4/2020 | Lee | H04W 28/0278 |

FOREIGN PATENT DOCUMENTS

| | | |
|---|---|---|
| RU | 2628489 C2 | 8/2017 |
| RU | 2643803 C1 | 2/2018 |
| WO | 2009086188 A2 | 7/2009 |
| WO | 2017055679 A1 | 4/2017 |

OTHER PUBLICATIONS

"Clarification on the Preamble group B selection", 3GPP TSG-RAN WG2 NR Ad hoc 1801, R2-1800965, Vancouver, Canada, Jan. 22-26, 2018, 1-4.

"Data Volume Indicator for NB-IOT", 3GPP TSG-RAN WG2 Meeting #93, R2-161671, LG Electronics Inc., St. Julian's, Malta, Feb. 15-19, 2016, 3 pages.

"Size of MSG3 in NR", 3GPP TSG-RAN #NR AH1801, Tdoc R2-1800381, Vancouver, Canada, Jan. 22-26, 2018, 1-4.

"TBS Limitation and Indication of Category for Low Complexity UEs", 3GPP TSG-RAN WG2 #87, Tdoc R2-143332, Ericsson, Dresden, Germany, Aug. 18-22, 2014, 6 pages.

* cited by examiner a)

b)

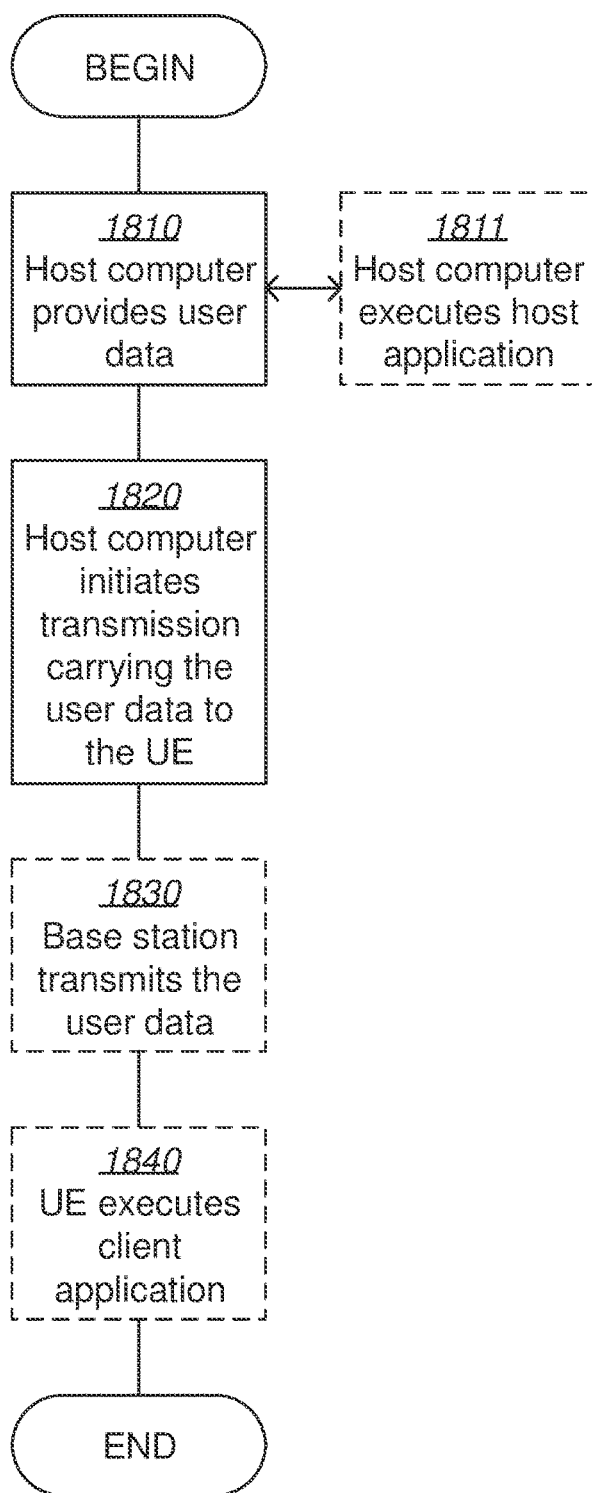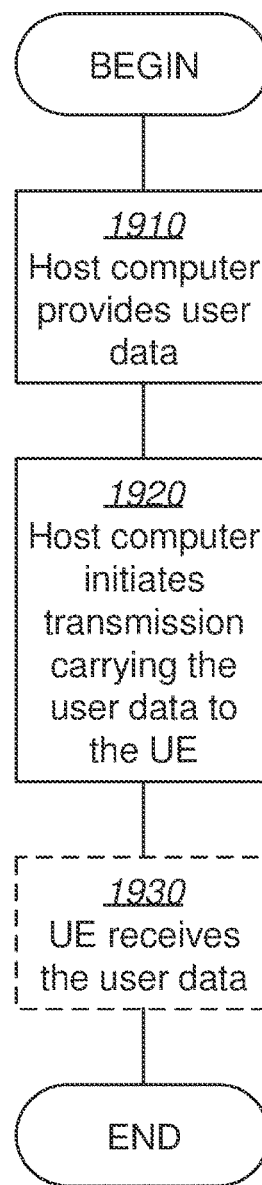
FIG. 18
FIG. 19

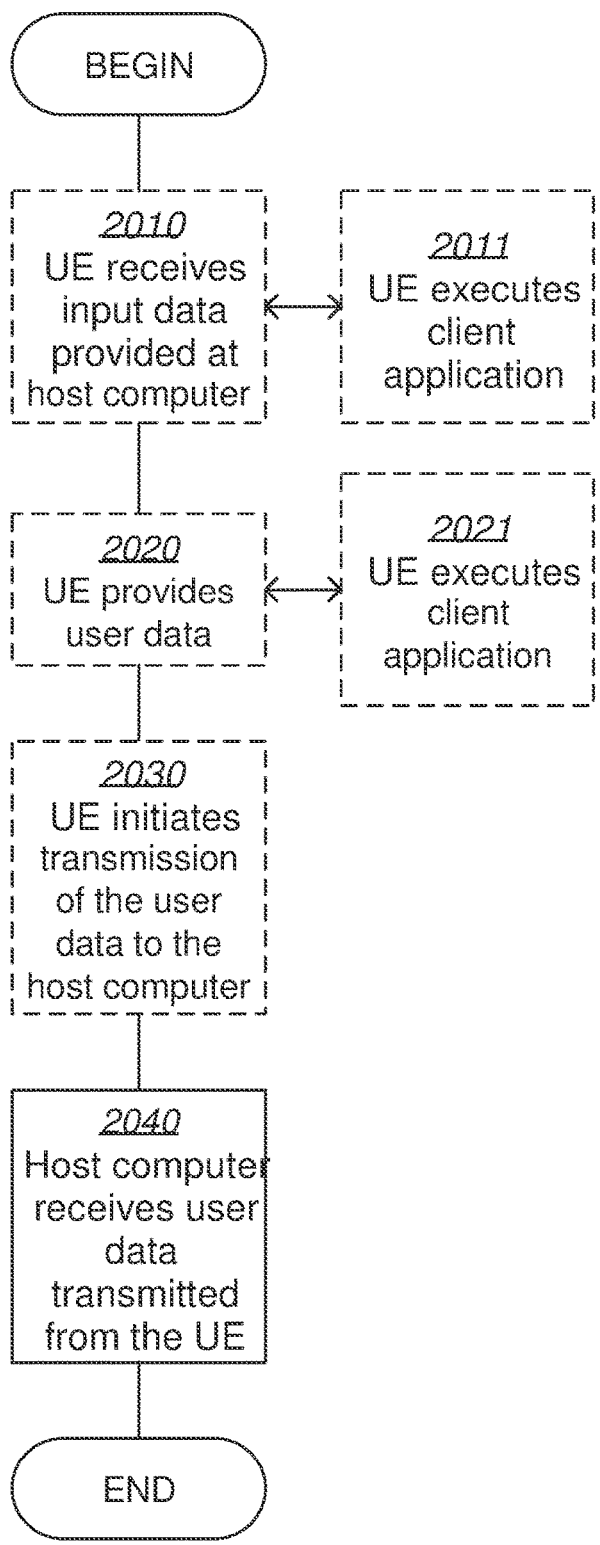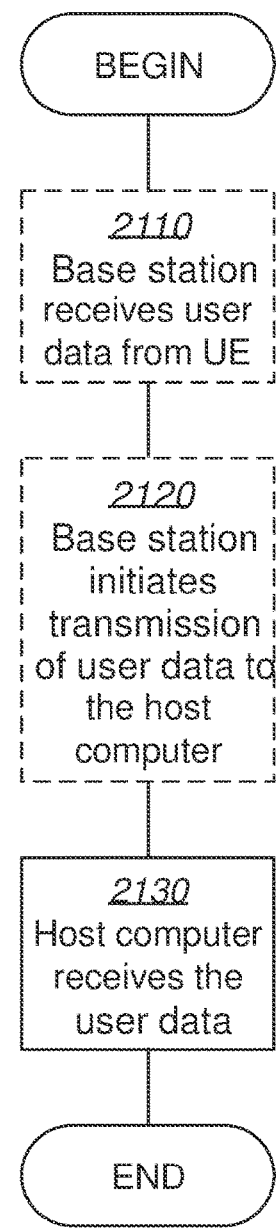
FIG. 20
FIG. 21

US 11,516,854 B2

METHODS AND APPARATUS SUPPORTING RANDOM ACCESS PROCEDURES IN A WIRELESS NETWORK

RELATED APPLICATIONS

This application is a continuation of U.S. application Ser. No. 16/329,258 filed 28 Feb. 2019, which is a U.S. National Phase Application of PCT/SE201.8/051358 filed 21 Dec. 2018, which claims benefit of Provisional Application No. 62/630,886 filed 15 Feb. 2018. The entire contents of each aforementioned application is incorporated herein by reference.

TECHNICAL FIELD

The present disclosure relates generally to a wireless device and methods performed thereby for providing a message to be sent to a network node serving the wireless device. The present disclosure also relates generally to a second node, and methods performed thereby processing the message from the wireless device served by the network node.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal a server.

Communication devices may also be network nodes, such as radio network nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base, Stations and Home Base Stations, based on transmission power and thereby also cell size. A cell is the geographical area where radio coverage is provided by the base station at a base station site. One base station, situated ori the base station site, may serve one or several cells. Further, each base station may support one or several communication technologies. The wireless communications network may also be a non-cellular system, comprising network nodes which may serve receiving odes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR

The so-called Fifth Generation (5G) system, from a radio perspective, started to be standardized in 3GPP, and the so-called New Radio (NR) is the name for the radio interface. One of the characteristics of NR is that the frequency range may use higher frequencies than LTE, e.g., above 6 GHz, where it is known to have more challenging propagation conditions such as a higher penetration loss. To mitigate some of these effects, multi-antenna technologies such as beamforming may be massively used. Yet another NR characteristic may be considered to be the use of multiple numerologies in DL and UL in a cell or for a UE and/or in different frequency bands. Yet another characteristic may be considered to be the possibility to enable shorter latencies. NR architecture is being discussed in 3GPP. In the current concept, gNB denotes NR BS, one NR BS may correspond to one or more transmission/reception points.

At RAN Meeting #78 in December 2017, the first 3GPP standard version for the 5G New Radio (NR) Access Technology was released. The December version of 3GPP has been focused on Non-standalone (NSA) NR while stand-alone (SA) NR will be the focus on the June 2018 version.

Information Processing in NR

Information, packets, may be processed by a network by flowing through a stack of so-called layers. A packet that may be received by a layer is called a Service Data Unit (SDU), while a packet that may be output by a layer may be referred to as a Protocol Data Unit (PDU), The present disclosure may be understood to be related to the MAC layer in NR. Further specifically, the current disclosure may be understood to be related to how to construct a. MAC PDU in NR. As specified by the current December 2017 version of TS 38.321, the UE may use a subheader format of either size 2 or 3 bytes to indicate any Medium Access Control (MAC) Service Data Unit (SDU).

Further details of the existing technology on how to construct a MAC PDU

A MAC PDU consists of one or more MAC subPDUs. Each MAC subPDU consists of one of the following: a) a MAC subheader only, including padding; b) a MAC subheader and a MAC SDU; c) a MAC subheader and a MAC Control Element (CE); and d) a MAC subheader and padding.

A MAC subheader for fixed sized MAC CE and padding consists of the two header fields: the Reserved bit (R) and the Logical Channel Identifier field (LCID), which may be referred to collectively as a R/LCID subheader. FIG. 1 is a schematic diagram depicting an R/LCID MAC subheader 10 from 3GPP TS 38.321, v1.5.0.0, FIG. 6.1.2-3. The R/LCID MAC subheader comprises an octet (Octet 1) 11, and 8 bits, as indicated by the marked line 12 at the top of the Figure. As schematically represented in FIG. 1, the R/LCID MAC subheader 10 comprises a first R field 13, a second R field 14 and the LCID field 15.

A MAC subheader, except for fixed sized MAC CE and padding, consists of the four header fields R/FILCID/L, where "F" is the Format field "L" is the Length field. It is provided in two formats, with an 8-bit L-field and with a 16-bit L-field. FIG. 2 is a schematic diagram depicting an R/F/LCID/L MAC subheader 20 with an 8-hit L field from 3GPP TS 38.321, v15.0.0, FIG. 6.1.2-1. As schematically represented in FIG. 2, the R/LCID MAC subheader 20 comprises, in a first octet 21, an first R field 22, the F field 23 and the LCD field 24, and, in a second octet 25, the 8-bit L field 26.

FIG. 3 is a schematic diagram depicting an R/F/LCID/L MAC subheader 30 with 16-bit L field in 3GPP TS 38.321, v15.0.0, FIG. 6.1.2-2. As schematically represented in FIG. 3, the R/F/LCID/L MAC subheader 30 comprises, in a first octet 31, the same fields described in the first octet 21 of FIG. 2, and in a second octet 32 and third octet 33, a 16-bit L field 34.

Table 1 depicts the Values of LCID for the Uplink Synchronization Channel (UL-SCH), from 3GPP TS 38.321, v15.0.0, Table 6.2.1-2. The values of LCIDs corresponding to MAC SDU may be one among 000000-100000, while 110111-111111 has been allocated for some MAC CE.

TABLE 1

| Index | LCID values |
| --- | --- |
| 000000 | CCCH |
| 000001-100000 | Identity of the logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

Random Access in NR

When a UE is trying to get access to a network, it may do so by performing the so-called Random Access Procedure. It may be understood that at this stage, the UE does not have any resource or channel available to inform the network about its desire to establish a connection, so it may be understood to have to send its initial request over the shared medium. The random access procedure may be used by e.g., idle or inactive UEs who wish to connect to the network for data transmissions. The random access procedure may be used also by connected UEs for various reasons such as Beam failure recovery, hand over and regaining of UL synchronization. The random access procedure may be carried out for different reasons and be either Contention Based Random Access procedure (CBRA) or Contention Free Random Access procedure (CFRA). The CBRA may start with a preamble selection and transmission from UE. The gNB may respond with a random access response (RAR), which may include a Temporary Cell Radio Network Temporary Identifier (C-RNTI), Timing Advance (TA) value and a grant for a Message 3 (Msg3). The Msg3 may be scheduled on the Physical Uplink Shared CHannel (PUSCH), as indicated by the grant received in the Random Access Response (RAR). In many CBRA cases, the Msg3 may comprise a Radio Resource Control (RRC) message, either the RRC connection request, RRC connection re-establishment request, or RRC connection resume request message, which may be understood to restrict its size. The RRC message may be a first RRC message sent on the Common Control Channel (CCCH). Msg3 may be understood to be the third message in the NR random access procedure and to carry the RRC connection request, RRC connection re-establishment request, and RRC connection resume request messages.

In case of CFRA, the UE may be in connected mode and may use a 16 bit C-RNTI as identifier, while CBRA, when carried out by Idle or inactive UEs, may need to supply a UE identity which may be understood to be significantly larger.

Sizes of Msg3 ire NR are not yet finally agreed, but a possible outcome may be as described in R2-1801162, Size of MSG3 in NR, Ericsson, 3GPP TSG-RAN #NR AI-11801, Jan. $22^{nd}$-$26^{th}$, 2018: 1) RRC Connection Request: 46 bits, wherein the octet-alignment may result in 6 bytes; 2) RRC Resume Request: 81 bits, wherein the octet-alignment may result in 11 bytes; and 3) RRC Connection re-establishment request 43 bits, wherein the octet-alignment may result in 6 bytes.

In addition to this, a MAC subheader of 2 bytes may be added to the Msg3 size. This may result in that, the minimum size of the t for Msg3 may need to be 8 bytes for RRC Connection Request, 13 bytes for RRC Resume Request and again 8 bytes for RRC Connection re-establishment request. As these RRC messages may be sent on Signalling Radio Bearer 0 (SRB0), which may use transparent mode in Radio Link Control Transparent mode (RLC TM), the RRC Protocol Data. Unit (PDU) may not be sent segments but may have to be sent within a single transport block.

MAC SDU for Common Control CHannel (CCCH)

The CCCH may be understood as the logical channel that may be used to transmit RRC messages on SRB0. The subheader for a Common Control CHannel (CCCH) SDU in Msg3 currently consists of the following fields:

The Reserved bit (R), set to "0";

The Logical Channel ID field (LOD), which may be understood to identify the logical channel CCCH with LCID=000000;

The Format field (F), set to "0" thus indicating an L-field of 8 bits, for a CCCH SDU payload of a variable size of up to 511 bytes. Technically, the value 1 is also available for larger payloads, but it may be considered that there may be no realistic; use for a larger CCCH payload;

The Length field (L), which may be understood to be used to set the size of the CCCH SDU.

The MAC SDU corresponding to CCCH starts at the next byte.

FIG. 4 is a schematic diagram depicting examples of an Msg3 payload CCCH SDU, according to existing technology. The example on the top panel a), shows a MAC SDU for CCCH RLC-TM of 6 bytes 41. The example at the bottom panel h) shows a MAC SDU for CCCH RLC-TM of 11 bytes 42. In both panels, the horizontal marked line 43 at the top of each panel indicates the number of bits, and the vertical marked line 44 on the left of each panel indicates the number of bytes. Both of the MAC SDU for CCCH RLC-TM of 6 bytes 41 and the MAC SDU for CCCH RLC-TM of 11 bytes 42 are preceded by a respective subheader comprising, in a first octet, an R field 45, a F field 46 comprising a value of "0", and a CCCH field 47 with the value "000000", and, in a second octet an L field 48. In panel a), the L field 48 comprises the value "00000110" whereas on panel b), the L field 48 comprises the value "00001011". Both of the MAC SDU for CCCH RLC-TM of 6 bytes 41 and the MAC SDU for CCCH RLC-TM of 11 bytes 42 are followed by three octets comprising Cyclic Redundancy Check CRC) sequences 49.

Existing methods to establish a connection between a wireless device and a network node, with the information processing technology described, may result in wasted resources, and/or limited coverage.

SUMMARY

It is an object of embodiments herein to improve random access operations in a wireless communications network.

According to a first aspect of embodiments herein, the object is achieved by a method performed by a wireless device. The wireless device operates in the wireless communications network. The wireless device provides a message to be sent to a network node operating in the wireless communications network. The message is a first scheduled message to be sent to the network node in a random access procedure. The message comprises a first indicator of a type of the message. The type of message has: a) a fixed size SDU, and b) a one byte header comprising the first indicator and lacking a second indicator of a length of a payload. The wireless device also initiates sending the provided message to the network node.

According to a second aspect of embodiments herein, the object is achieved by a method performed by a network node. The network node operates in the wireless communications network. The network node receives the message from the wireless device operating in the wireless communications network. The message is the first scheduled message received by the network node in the random access procedure. The message comprises the first indicator of the type of the message. The type of message has: a) the fixed size SDU, and b) the one byte header comprising the first indicator and lacking the second indicator of the length of the payload. The network node also initiates processing the received message, based on the first indicator.

According to a third aspect of embodiments herein, the object is achieved by a wireless device. The wireless device is configured to operate in the wireless communications network. The wireless device is further configured to provide the message to be sent to the network node configured to operate in the wireless communications network. The message is a first scheduled message to be sent to the network node in a random access procedure. The message comprises a first, indicator of a type of the message. The type of message has: a) the fixed size SDU and h) the one byte header comprising the first indicator and lacking the second indicator of the length of the payload. The wireless device is also configured to initiate sending the provided message to the network node.

According to a fourth aspect of embodiments herein, the object is achieved by the network node. The network node is configured to operate in the wireless communications network. The network node is further configured to receive the message from the wireless device configured to operate in the wireless communications network. The message is the first scheduled message received by the network node in the random access procedure. The message comprises the first indicator of the type of the message. The type of message has: a) the fixed size SDU and b) the one byte header comprising the first indicator and lacking the second indicator of the length of the payload. The first node is further configured to initiate processing the received message, based on the first indicator.

According to a fifth aspect of embodiments herein, the object is achieved by a wireless device comprising a processing circuitry and a memory. The memory contains instructions executable by the processing circuitry, whereby the wireless device is operative to provide the message to be sent to the network node comprised in the wireless communications network. The message is the first scheduled message to be sent to the network node in the random access procedure. The message comprises the first indicator of the type of the message. The type of message has: a) the fixed size SDU and h) the one byte header comprising the first indicator and lacking the second indicator of the length of the payload. The memory also contains instructions executable by the processing circuitry, whereby the wireless device is further operative to initiate sending the provided message to the network node.

According to a sixth aspect of embodiments herein, the object is achieved by a network node comprising a processing circuitry and a memory. The memory contains instructions executable by the processing circuitry, whereby the network node is operative to receive the message from the wireless device comprised in the wireless communications network. The message is the first scheduled message received by the network node in the random access procedure. The message comprises the first indicator of the type of the message. The type of message has: a) the fixed size SDU, and b) the one byte header comprising the first indicator and lacking the second indicator of the length of the payload. The memory also contains instructions executable by the processing circuitry, whereby the network node is further operative to initiate processing the received message, based on the first indicator.

By the wireless device providing the message comprising the first indicator of the type of the message, using the fixed size SDU, the wireless device is enabled to flexibly provide the first type of message with a size shrunk by a factor of ⅛. The first indicator in the message enables the network node to be aware of the type of message received from the wireless device, and initiate processing it accordingly. Therefore, flexibility is conferred to the wireless device during random access, and the possibility of saving resources is enabled, increasing the capacity of the wireless communications network, reducing latency, and increasing coverage.

BRIEF DESCRIPTION OF THE DRAWINGS

Examples of embodiments herein are described in more detail with reference to the accompanying drawings, and according to the following description.

FIG. 18 is a flowchart depicting embodiments of a method in a communications system including a host computer, a base station and a user equipment, according to embodiments herein.

FIG. 19 is a flowchart depicting embodiments of a method in a communications system including a host computer, a base station and a user equipment, according to embodiments herein.

FIG. 20 is a flowchart depicting embodiments of a method in a communications system including a host computer, a base station and a user equipment, according to embodiments herein.

FIG. 21 is a flowchart depicting embodiments of a method in a communications system including a host computer, a base station and a user equipment, according to embodiments h ein.

DETAILED DESCRIPTION

Figure 1:
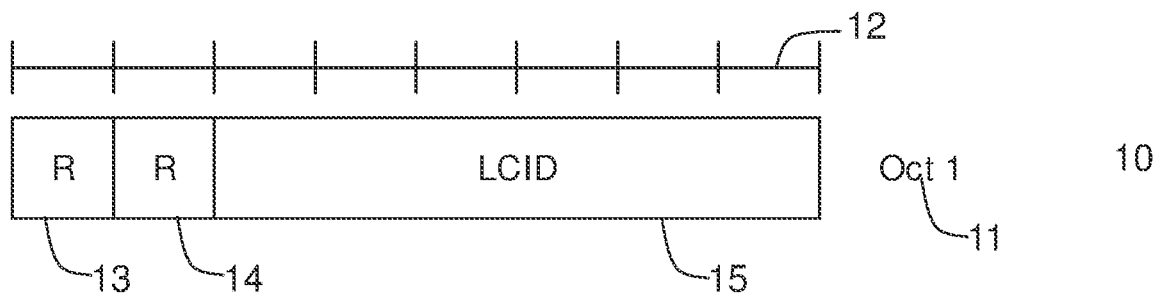
FIG. 1 is a schematic diagram depicting a R/LCID MAC subheader in 3GPP TS 38.321, v15.0.0 (FIG. 6.1.2-3)
Figure 2:
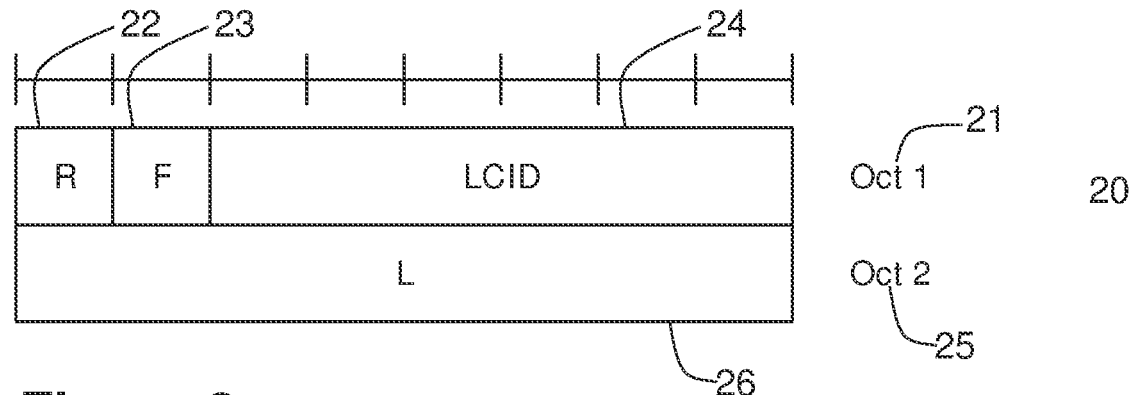
FIG. 2 is a schematic diagram depicting a R/F/LCID/L MAC subheader with 8-bit L field in 3GPP TS 38.321, v1.5.0.0 (FIG. 6.1.2-1).
Figure 3:
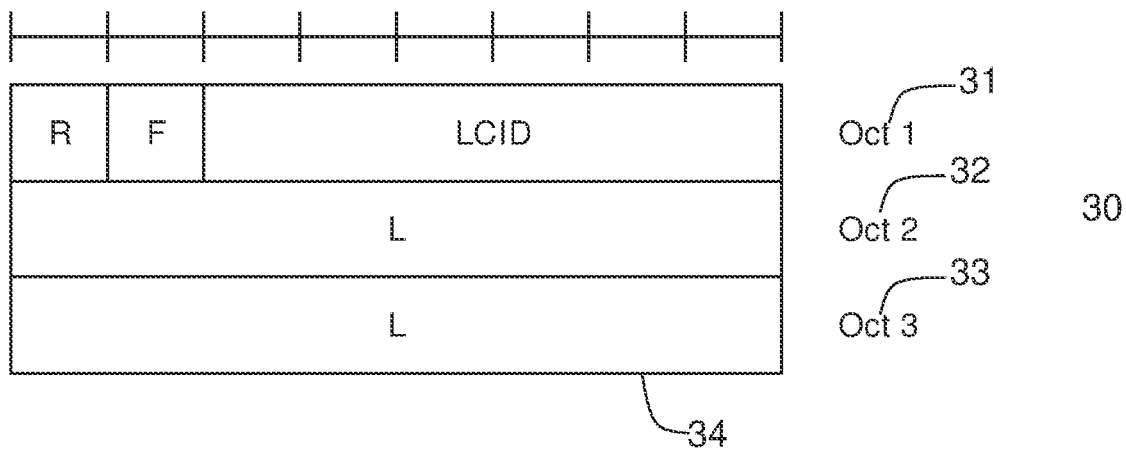
FIG. 3 is a schematic diagram depicting a RIF/LCID/L MAC subheader with 16-bit L field in 3GPP TS 38.321, v15.0.0 (FIG. 6.1.2-2).
Figure 4:
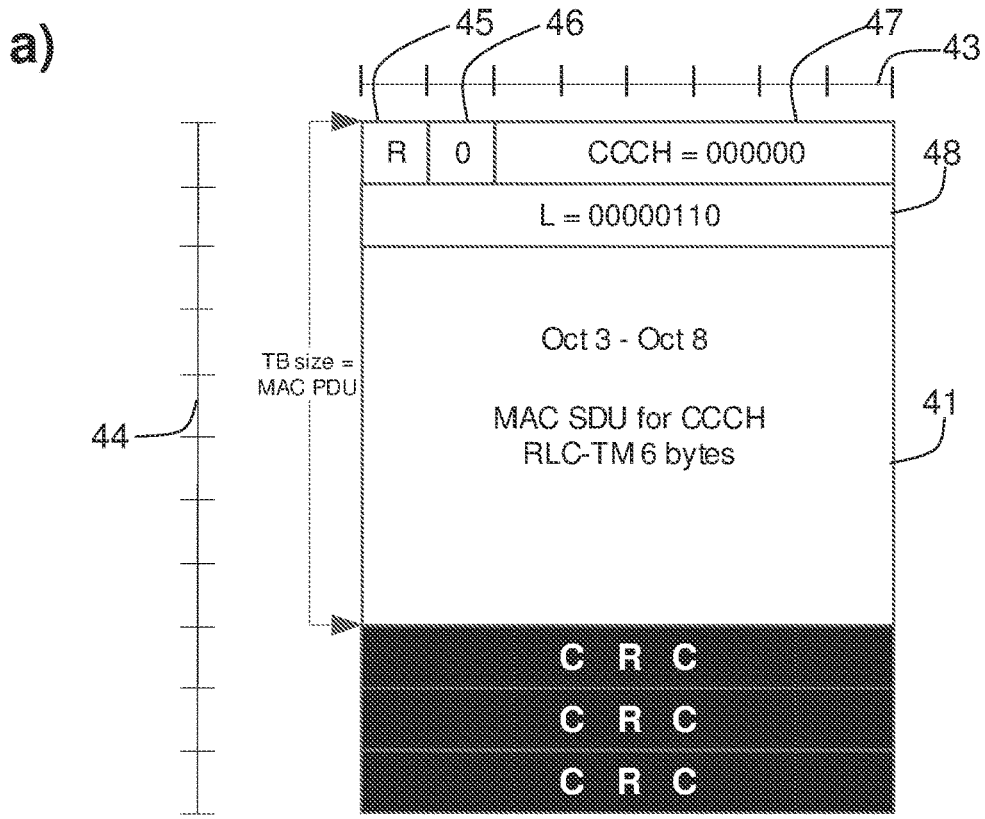
FIG. 4 is a schematic diagram depicting an Msg3 payload SDU in existing technology.
Figure 4:
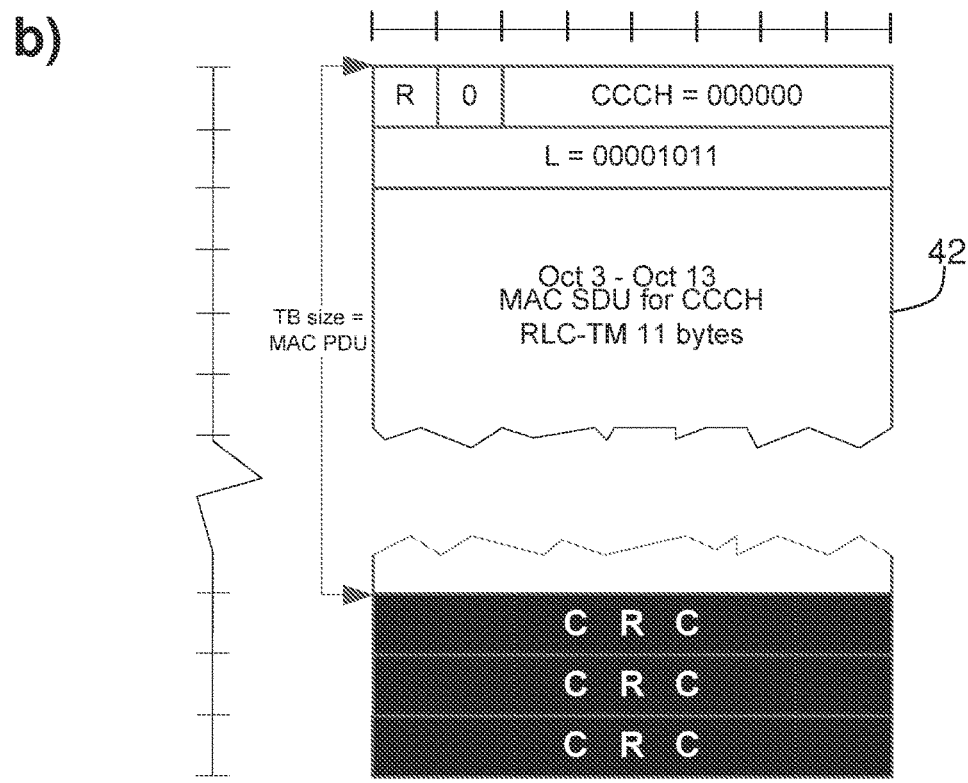

As part of the development of embodiments herein, one or more problems with the existing technology will first be identified and discussed.

During random access, Msg3 may be understood as the first scheduled message, that is, the first scheduled message by the network, that may be sent by a UE, and the first message that may be sent on the Physical Uplink Shared CHannel (PUSCH). At this stage, the channel conditions may not be fully known, and it may be understood to be important that Msg3 may be constructed in a way as to ensure as robust a transfer as possible. Since the content of Msg3 may also be understood to be u known to the gNB, the gNB may need to ensure that the grant is large enough to fit the Msg3. To issue grants which are too large will waste resources, and also limit coverage. This is why it may be understood to be important to fine tune the grant size to the minimum of what may be needed. Any saving in grant size may be understood to have a positive effect on all Msg3 transmissions by not issuing resources which are not used.

Certain aspects of the present disclosure and their embodiments may provide solutions to this challenge or other challenges, There are, proposed herein, various embodiments which address one or more of the issues disclosed herein.

Embodiments herein may be understood to address this problem in existing methods by providing a Msg3 as a fixed-size SDU, and providing a 1-byte header format without an L-field for its transfer.

Further, by recognizing there are just few use cases where Msg3 may be sent with not fully known channel conditions, the solution suggests separate LCIDs for fixed-size SDUs. Particular embodiments herein may be understood to be related to MAC subheader for CCCH payload.

Some of the embodiments contemplated will now be described more fully hereinafter with reference to the accompanying drawings, in which examples are shown. In this section, the embodiments herein will be illustrated in more detail by a number of exemplary embodiments, Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. Several embodiments are comprised herein. It should be noted that the exemplary embodiments herein are not mutually exclusive. Components from one embodiment may be tacitly assumed to be present in another embodiment and it will be obvious to a person skilled in the art h those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within his disclosure.

Figure 5:
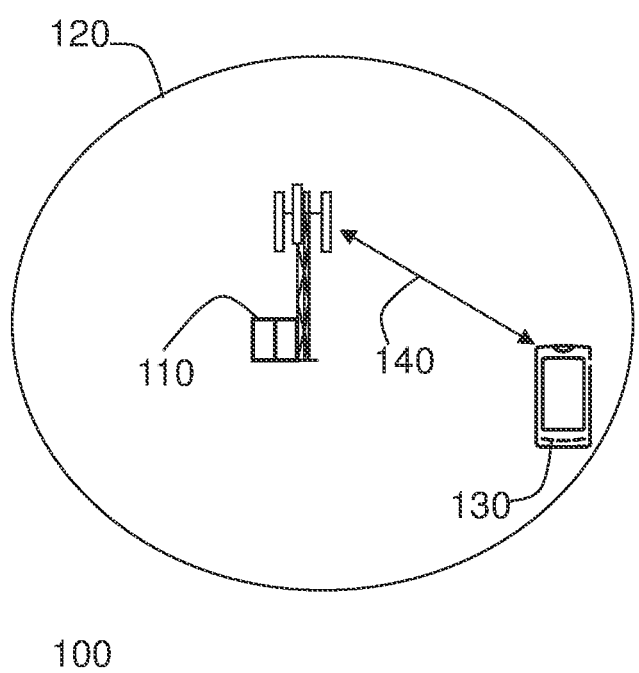
FIG. 5 is a schematic diagram illustrating a wireless communications network, according to embodiments herein.

FIG. 5 depicts a non-limiting example of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may alternatively be a younger system than a 5G system. The wireless communications network 100 may support other technologies such as, for example, Long-Term Evolution (LTE), LTE-Advanced/LTE-Advanced Pro, e.g., LTE Frequency Division Duplex (MD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure to exemplify embodiments herein, this should not be seen as limiting the scope of the embodiments herein to only the aforementioned system.

The wireless communications network 100 comprises a plurality of network nodes, whereof a network node 110 is depicted in the non-limiting example of FIG. 5. The network node 110 may be a radio network node, such as a radio base station, or any other network node with similar features capable of serving a wireless device, such as a user equipment or a machine type communication device, in the wireless communications network 100. In typical embodiments, the network node 110 may be a transmission point operating on NR, for example a New Radio (NR) NodeB (gNB). In some examples, the network node 110 may be radio base station operating on LTE, such as an eNB.

The wireless communications network 100 covers a geographical area which may be divided into cell areas, wherein each cell area may be served by a network node, although, one radio network node may serve one or several cells. The wireless communications network 100 comprises at least a cell 120. In the non-limiting example depicted in FIG. 5, the network node 110 serves the cell 120. The network node 110 pray be of different classes, such as, macro base station (BS), home BS or pico BS, based on transmission power and thereby also cell size. The network node 110 may be directly connected to one or more core networks, which are not depicted in FIG. 5 to simplify the Figure. In some examples, the network node 110 may be a distributed node, such as a virtual node in the cloud, and it may perform its functions entirely on the cloud, or partially, in collaboration with a radio network node.

A plurality of wireless devices are located in the wireless communication network 100, whereof a wireless device 130, which may also be referred to as a device, is depicted in the non-limiting example of FIG. 5. The wireless device 130, e.g., a 5G LT, may be a wireless communication device which may also be known as e.g., a UE, a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may be comprised within the wireless communications network 100.

The wireless device 130 may be configured to communicate in the wireless communications network 100 with the network node 110 over a link 140, e.g., a radio link, although communication over more links may be possible.

Generally, all terms used herein are to be interpreted according to their ordinary meaning in the relevant technical field, unless a different meaning is clearly given and/or is implied from the context in which it is used. All references to a/an/the element, apparatus, component, means, step, etc. to be interpreted openly as refers ing to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth" and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other example embodiments.

More specifically, the following are: a) embodiments related to a wireless device, such as the wireless device 130, e.g., a 5G UE; and b) embodiments related to a network node, such as the network node 110, e.g., a gNB.

A method, performed by the wireless device 130 is described herein. Embodiments of the method performed by the wireless device 130 will now be described with reference to the flowchart depicted in FIG. 6. The method may be understood to be for providing a message to be sent to the network node 110 serving the wireless device 130. The wireless device 130 operates in the communications network 100. The network node 110 may also be understood to operate in the wireless communications network 100. The wireless communications network 100 may operate on NR.

Figure 6:
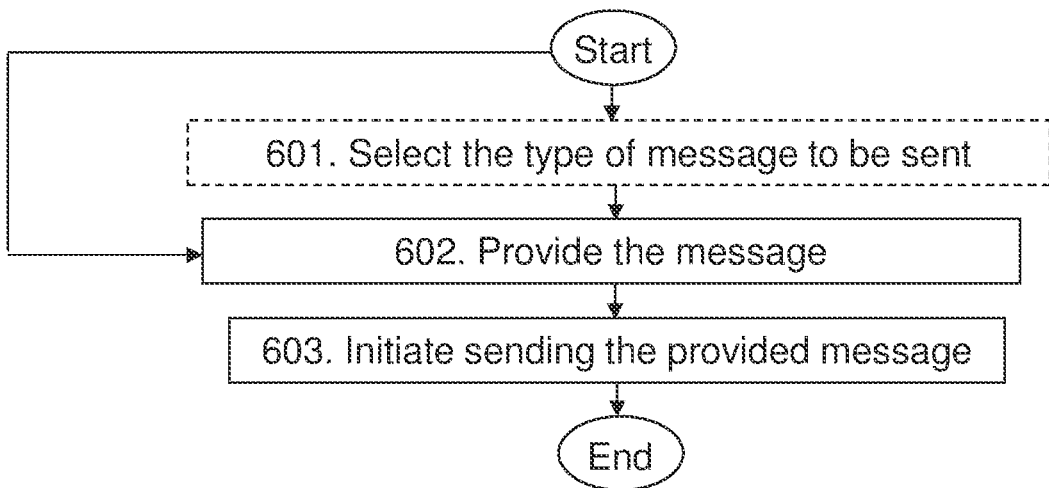
FIG. 6 is a flowchart depicting a method in a wireless device, according to embodiments herein.

The method may comprise the following actions. In some embodiments all the actions may be performed. In some embodiments, one or more actions may be performed. One or more embodiments may be combined, where applicable. All possible combinations are not described to simplify the description. Components from one example may be tacitly assumed to be present in another example and it will be obvious to a person skilled in the art how those components may be used in the other examples. In FIG. 6, an optional action is indicated with dashed lines. Some actions may be performed in a different order than that shown in FIG. 6.

Some embodiments herein will be further described with sonic non-limiting examples facilitate to the embodiments herein.

Action 601

In the course of communications in the wireless communications network 100, the wireless device 130 may, for example, move within the geographical area covered by the wireless communications network 100, and it may detect the cell 120 of the network node 110. If the wireless device 130 desires to establish a connection with the network node 110, it may then initiate a random access procedure, which may be understood to involve exchanging some messages with, in this case, the network node 110. Very succinctly, the wireless device 130 may first send a preamble to the network node 110, and in response the network node 110 may send a response to the wireless device 130 comprising, among other information, a grant of uplink resource the wireless device 130 may then use to send a message to the network node 110.

The message to be sent to the network node 110 may be of a type. In some embodiments, the type of message may have one or lore features related to a size of the SDU to be comprised in the message to be sent, such as for example, a fixed size SDU or a variable size SDU, which will be described further down.

According to some embodiments herein, in this Action 601, the wireless device 130 may select a type of message to be sent to the network node 110. The selecting in this Action 601 of the type of message may be based on at least one of: a) a size of the grant that may have been received from the network node 110 to transmit the message, b) the preamble that may have been sent by the wireless device 130, e.g., to the network node 110, and c) a grouping of the sent preamble.

The preamble may be used by the wireless device 130 to request a grant size large enough to transmit the selected message.

A grouping of the preamble may be understood herein as referring to a set of preambles the preamble may belong to, e.g., preamble group A and preamble group B. The grouping of the sent preamble may be related to the size of the message, and therefore of the type of message that may be sent. This may be understood to be because one way to handle grant assignment may be to use a minimum grant for CBRA using preamble group A, i.e., setting the ra-Msg3Size Group A to the minimum grant size. If the wireless device 130, e.g., a UE, wishes to transmit a Msg3 larger than the minimum grant size, it may need to use preamble group B which may be understood to use a larger grant. Preamble group B may then handle cases requiring a larger grant such as RRC Resume Request.

The grant may be understood to comprise transmission parameters associated to the grant, e.g., Msg3 PUSCH frequency resource allocation, Msg3 PUSCH time resource allocation, and Modulation and Coding Scheme MCS for the transmission, which may be understood to translate to e.g., an "Msg3 size".

In some embodiments, the type of message may have: a) a fixed size SDU, and b) a one byte header comprising a first indicator of a type of the message, and lacking a second indicator of a length of a payload in the message.

The SDU may be a CCCH SDU, that is, a MAC SDU for CCCH,

In some examples, the fixed size may be, e.g., 6 bytes.

In some embodiments, the header may be a MAC subheader, and the first indicator may be a value in an LCID field in the MAC subheader. In some particular embodiments, the value may be "110110". In other embodiments, this value may take a different value, which is referred to herein as a first value in the second group of embodiments which will be described below, or a second value, in a third group of embodiments which will be described below, or as a "third value" in a first group of embodiments.

The second indicator may be a type of field, e.g., a first type of field, for example, the Length (L) field. The length field may be understood to be not necessary, as there may be only one MAC subPDU in the MAC PDU. To save one byte, the format for fixed size MAC CE, shown later in e.g., FIG. 10, may be used. This may be understood to reduce the size of the MAC subheader by one byte and make it possible to fit the Msg3 transmission with a 7 byte grant.

In some examples, the subheader for a CCCH SDU with fixed size may consist of, the following fields:

LCID: The Logical Channel ID field with a fixed LCD value X in the range 000000-111111, e.g. 000000, used to indicate CCCH access with a fixed size SDU; and R: Reserved bit, set to "0", In some particular examples 2 R fields may be comprised, as depicted in FIG. 7a).

In other examples, LCID with a value set to 000000, may be used to indicate a CCCH access with a MAC SDU of a predetermined size, e.g. Z=6 bytes. I In yet other examples, a new LCID for the CCCH access with fixed size SDU may be allocated.

Signalling

The mapping of LCID to fixed size may be specified in the standard according to embodiments herein in a new 3GGP TS 38.321 in table 6.2.1-2, as shown below. At present, 000000, indicates a variable sized CCCH payload.

TABLE 2

| Index | LCID values |
| --- | --- |
| 000000 | CCGH |
| 000001-100000 | Identity of the logical channel |
| 100001-110101 | Reserved |
| 110110 | CCCH of Z bytes |

TABLE 2-continued

| Index | LCID values |
| --- | --- |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

It may also be possible to send the mapping in NR System Information Block 1 (SIB1), which may be beneficial in case the sizes may need updates.

In some embodiments, the type of message may be a first type of message of a plurality of types of messages, wherein the plurality of types of messages may comprise a second type of message. Examples of the types of messages are described below for different groups of examples.

First Group of Examples

In some of the examples wherein the type of message may be the first type of message of the plurality of types of messages, and wherein the plurality of types of messages may comprise the second type of message, the first type of message may be understood to have: a) the fixed size SDU, and b the one byte header comprising first indicator of the type of the message, and lack the second indicator of the length of the payload. The second type of message may have a variable size SDU and the second indicator of the length of the payload.

Figure 7:
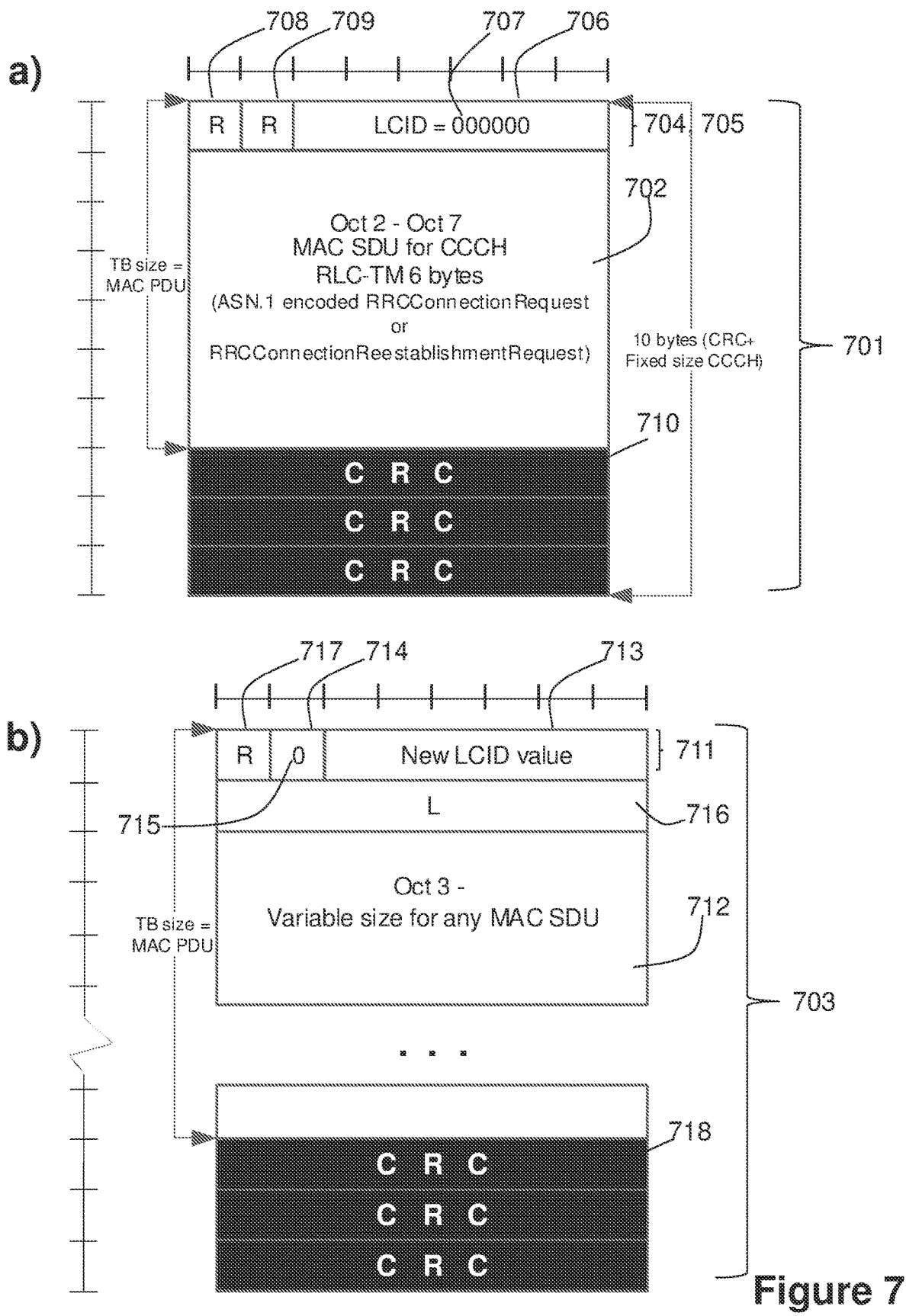
FIG. 7 is a schematic diagram depicting a fixed (a) and variable (b) sized. CCCH SDU, according to embodiments herein.

In the first group of examples, the third value, as mentioned before, may be used. LCID 000000 may be used to indicate a CCCH access with a MAC SDU of a predetermined size, e.g. Z=6 bytes, and a new LCID, with the third value, may be allocated for a CCCH access with a MAC SDU of variable size. The new LCID may need to be a fixed value in the presently reserved range 100001-110110. For proprietary solutions, some LCID which may be allocated for another purpose may also be used, but which may be not likely to occur at a time of sending CCCH. FIG. 7 illustrates the case, and will be described later.

FIG. 7 is a schematic diagram illustrating a non-limiting preferred example for a first type of message 701 comprising a fixed sized SDU 702, panel a), and a second type of message 703 comprising a variable sized CCCII SDU, panel b), according to examples of embodiments herein.

In this example, the header 704 is a MAC subheader 705. In some examples of this example, the subheader 704 for a CCCH SDU with fixed size may consist of the following fields:

LCID 706: The Logical Channel ID field with a fixed LCID value X in the range 000000-111111, e.g. 000000, used to indicate CCCH access with a fixed size SDU. In this example, the value in the LCID field 706 is the first indicator 707.

R: Reserved bit, set to "0". As depicted in panel a), there is a first R field 708, and a second R field 709.

The actual MAC SDU for CCCH, in the depicted example is an RLC TM of 6 bytes, which may be an ASN.1 encoded RRC Connection Request, or an RRC Connection Reestablishment Request, may occupy Octet (Oct) 2 to Oct 7. Three octets of CRC 710 may then be appended to the fixed size SDU, resulting in a total of 10 bytes, as indicated by the arrow to the right. The Transport Block (TB) size of the MAC PDU is indicated by the arrow on the left.

In some examples, as depicted in panel b), the subheader 711 for a CCCH SDU with variable size 712 may consist of the following fields:

LCID 713: The Logical Channel ID field with a fixed LCID value Y< >X in the range 000000-111111, e.g. a value in the currently reserved range 100001-110110, may be used to indicate CCCH access with a variable size SDU.

F 714: The Format field may be set to "0" to indicate a 8 bits L-field, and to "1" to indicate a 16 bits L-field; In this example, the value in the F field 714 is the first indicator 715.

L 716: The Length field may be used in subheader with LCID=Y to set the size of the CCCH SDU;

R 717: Reserved bit, set to "0".

An alternative variant of this example, may be to use LCID 000000 for CCCH access with a variable sized SDU, and instead allocate a new LCID for the CCCH access with fixed size SDU, i.e. vice versa. Either way may be plausible.

The actual MAC SDU for CCCH may start on Oct 3. Three octets of CRC 718 may then be appended to the variable size SDU. The Transport Block (TB) size of the MAC PDU is indicated by the arrow on the left.

Second Group of Embodiments

In a second group of examples, the first indicator may be a first value in a first field in the MAC subheader, wherein the MAC subheader may further comprise an LCID field, the LCID field comprising a second value. No graphical representation of this group of embodiments is provided.

For example, in the second group of examples, the first indicator may be a second type of field, such as the Reserved (R) field. The first value may be, e.g., "0". The LCDI field may be referred to e.g., as a third type of field. The MAC subheader in the second group of examples may be referred to as a first subheader.

The second value may be, e.g., an LCDI value of "000000".

In the second group of examples, the reserved bit R as it occurs in the MAC PDU subheader for a CCCH SDU may be allocated and used to toggle fixed small vs. variable larger sized SDU in the payload, or which is the same, allocated and used to indicate presence of L-field in the header. The reserved bit R may therefore comprise the first value. One benefit of this approach may be understood to be that it may use one and same LCID value, that is, the second value, 000000 for all CCCH accesses. If the bit is set to 1, the L-field may be understood to be contained. If bit is set to 0, the CCCH payload may be understood to have a fixed size.

The fixed size may be determined in advance and specified to the number of bytes that may be required to encapsulate any of CCCH messages for initial access. As an example, 6 bytes to encapsulate either of a 46 hit message rrcConnectionRequest or a 43 bit message rrcConnectionReestablishmentRequest.

Third Group of Embodiments

Figure 8:
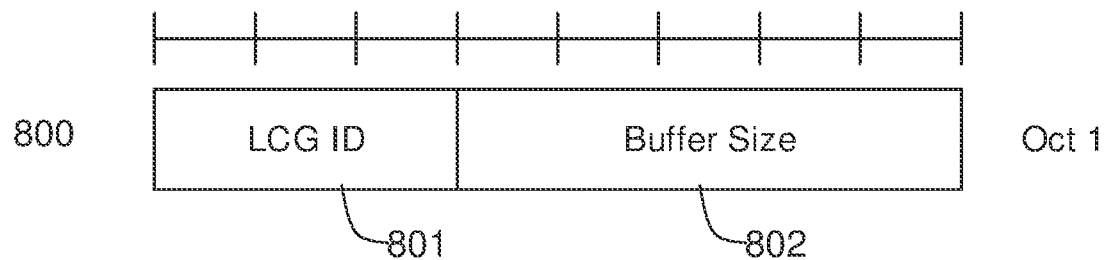
FIG. 8 is a schematic diagram depicting a Short BSR and Short Truncated BSR MAC CE, that may be used according to embodiments herein.
Figure 9:
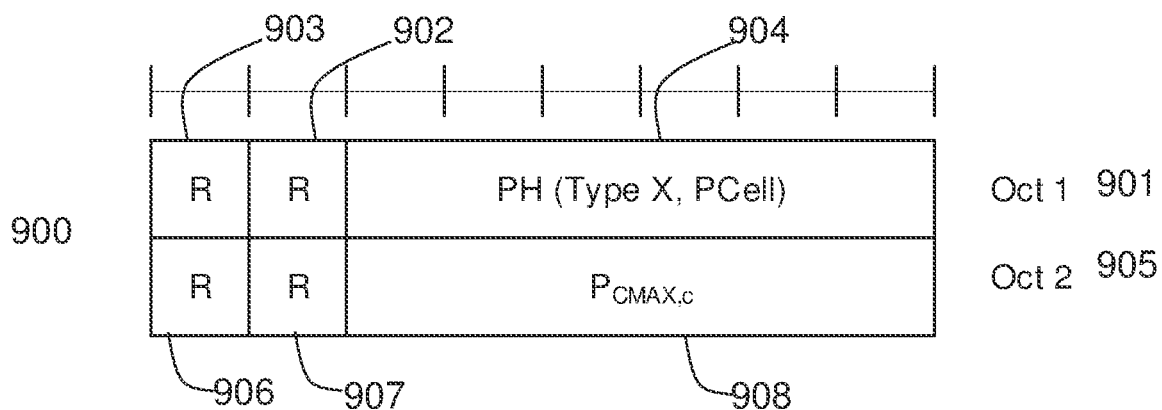
FIG. 9 is a schematic diagram depicting a Single Entry PHR MAC CE, that may be used according to embodiments herein.

In a third group of examples, the fixed size may be associated with the Msg3 as such, rather than specifically with certain CCCH payloads. As discussed above, Msg3 may be understood to be the first scheduled message that may be sent by the wireless device 130, e.g., a UE, and the first message that may be sent on PUSCH. The above examples may be considered to discriminate certain fixed CCCH sizes which may be understood to help to minimize the size of Msg3 and, as such, useful to make its transfer as robust as possible. However, decreasing the size that may be needed to transfer CCCH may not help to provide the scheduler what data buffers and channel conditions may be at hand. For that purpose, additional content to the first scheduled message, that is, additional Msg3 content, comprising Buffer Status Report (BSR) and Power HeadRoom (PHR) reports may be needed. As part of the problem with existing methods, the BSR and PHR subPDUs may each require a subheader, that is, two or more extra header bytes may be required. FIG. 8 and FIG. 9 show the format for two fixed size variants of BSR and PHR respectively, the short/truncated BSR and the Single Entry PHR according to existing methods, which may be used in embodiments herein, as described.

FIG. 8 is a schematic diagram depicting a Short BSR and Short Truncated BSR MAC CE, which may be understood as an example of a first MAC CE 800, FIG. 6.1.3.1-1 in TS 38.321-v15.0.0, 2018-01-04 which may be used in embodiments herein, as described.

The fields in the Short BSR MAC CE, the first MAC CE 800, as e.g., depicted in FIG. 8, may be defined as follows:

LCG ID: The Logical Channel Group ID field may be understood to identify the group of logical channel(s) whose buffer status is being reported. The length of the field may be 3 bits; The LCG ID field may be understood herein as an example of a second field 801 indicating a group of one or more logical channels.

Buffer Size: The Buffer Size field may be understood to identify the total amount of data that may be available across all logical channels of a logical channel group after the MAC PDU may have been built. The amount of data may be indicated in number of bytes. The length of this field for the Short BSR format and the Short Truncated BSR format may be 5 bits. The LCG ID field may be understood herein as an example of a third field 802 comprising first information on a status of a buffer related to the group of the one or more logical channels.

FIG. 9 is a schematic diagram depicting a Single Entry PHR MAC CE, FIG. 6.1.3,8-1 in TS 38,321-v15.0.0, Jan. 4, 2018 which may be used in embodiments herein, as described, which may be understood as an example of a second MAC CE 900.

The fields in the Single Entry PHR MAC CE, the second MAC CE 900, as e.g., depicted in FIG. 9, may be defined as follows in a first octet (Oct 1) 901:

R: reserved bit, set to "0" in a first R field 902, and also an second R field 903;

Power Headroom (PH): this field indicates the power headroom level. The length of the field is 6 bits. The PH field may be understood as an example of a fourth field 904 comprising second information on a power headroom, Also depicted in FIG. 9 is a second octet (Oct 2) 905, comprising a third R filed 906, a fourth R field 907, and a PCMAX,c field 908 in the second octet 905.

Figure 10:
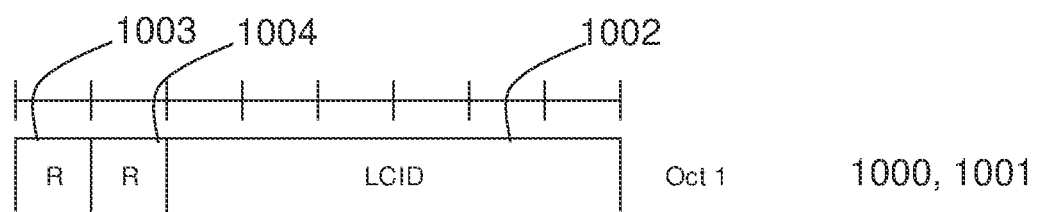
FIG. 10 is a schematic diagram depicting a R/LCID MAC subheader, according to embodiments herein.

FIG. 10 shows the subheader that may be used for the purpose of including either of above, i.e. Short BSR or Single Entry PHR, in the first scheduled message, that is, the Msg3. The subheader may be understood as an example of a common subheader 1000 which will be further described herein. FIG. 10 is a schematic diagram depicting a R/LCID MAC subheader 1001, as an example of the common subheader 1000, FIG. 6.1.2-3 in TS 38.321-v15.0.0, Jan. 4, 2018, which may be used in embodiments 1 rein, as described. The LCID field 1002 in FIG. 10 may comprise the fourth value. Also comprised in the R/LCID MAC sub eater 1001 are a first R field 1003, and a second R field 1004.

In the third group of examples, the first scheduled message, that is, the Msg3 may minimized and may consist of the following:
subheader for fixed size Msg3;
CCCH message of Z bytes;
Short/truncated BSR MAC CE of 1 byte;
Single Entry PHR.
Or more generally, understanding that the CCCH message may be just a special case:
subheader for fixed size Msg3;
Identity message of Z bytes;
Short/truncated. BSR MAC CE of 1 byte;
Single Entry PHR.

The first scheduled message, that is, the Msg3, may be encoded/decoded by MAC, according to 3GPP TS 38.321, and while the content of a CCCH message may require higher layer schemes, the bits and pieces of the CCCH payload may be used to discriminate the wireless device 130, e.g., a UE, among other UEs that simultaneously may have used the same contention based random access preamble.

Figure 11:
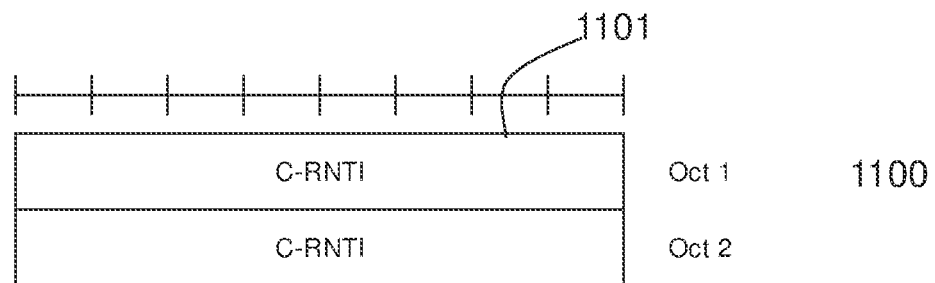
FIG. 11 is a schematic diagram depicting a C-RNTI MAC CE, according to embodiments herein.

FIG. 11 defines the identity message that may be required by the first wireless device130, e.g., a UE that may be already connected and may have received a C-RNTI to identify itself on UL-SCH, the UL shared channel. FIG. 11 is a schematic diagram depicting a C-RNTI MAC CE 1100 FIG. 6.1.3.2-1 in TS 38.321-v15.0.0, Jan. 4, 2018, which may be used in embodiments herein, as described.

The field in the C-RNTI MAC CE 1100, as depicted in e.g., FIG. 11, may defined as follows:

C-RNTI 1101: This field may contain the C-RNTI of the MAC entity. The length of the field may be 16 bits.

Figure 12:
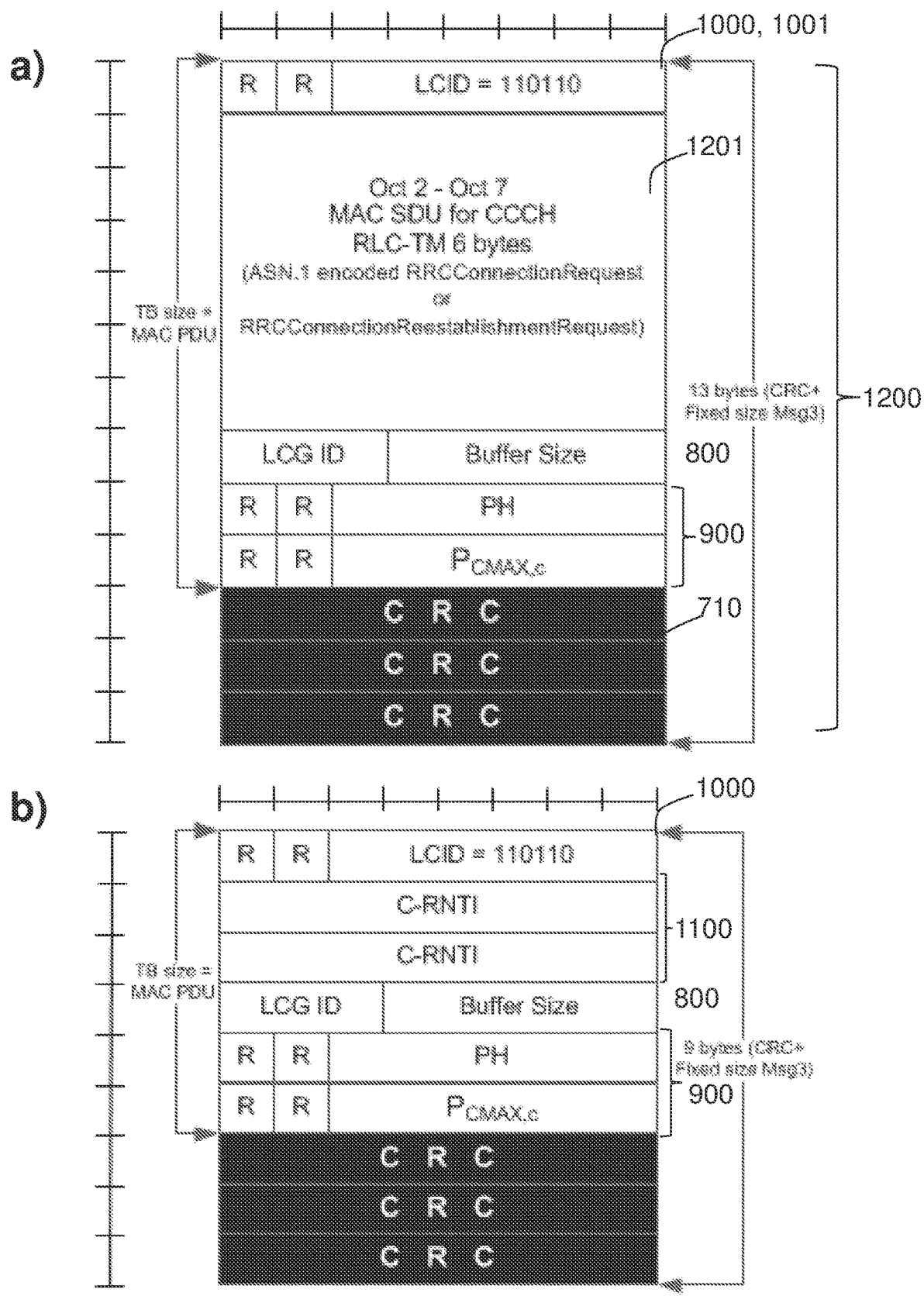
FIG. 12 is a schematic diagram depicting a Fixed Msg3 size for CCCH (a), an a Fixed Magi size for a connected user (b), according to embodiments herein.

FIG. 12 illustrates non-limiting examples, in panels a) and b), of the gird group of examples just described, with MAC CEs for BSR and PHR placed after the MAC SDUs. FIG. 12 show a schematic diagram depicting a non-limiting example of a fixed Msg3 size for CCCH as an example of a third type of message 1200, in panel a), and a non-limiting example of a Fixed Magi size for a connected user, panel b) as another example of the third type of message 1200. In panel a), the R/LCID MAC subheader 1001 as an example of the common subheader 1000, precedes a MAC SDU for CCCH 1201 of 6 bytes as an example of a fixed size SDU 1201, and is followed by the first MAC CE 800, the second MAC CE 900, and three octets of CRC 704. The message has a total size of 13 bytes, as indicated by the arrow on the right of the panel. Ih panel b), in the R/LCID MAC subheader 1000, is followed by the C-RNTI MAC CE 1100, the Short. BSR MAC CE 800, the Single Entry PHR MAC CE 900, and three octets of CRC 710. The message in this example has a total size of 9 bytes, as indicated by the arrow on the right of the panel.

According to the foregoing, in the third group of examples, wherein the type of message may be the first type of message 701 of the plurality of types of messages, the plurality of types of messages may comprise the third type of message 1200. The third type of message 1200 may be fixed in size, and may comprise one common subheader 1000 for: a) a fixed size SDU 1201 and at least one of: b) the first MAC control element 800 being fixed in size, e.g., the Short BSR MAC CE, as e.g., depicted in FIG. 8, comprising: i) the second field 801, e.g., the Logical Channel Group ID field, indicating a group of one or more logical channels, and ii) a third field 802, e.g., the Buffer Size field, comprising first information on a status of a buffer related to the group of the one or more logical channels; and c) a second MAC control element 900 fixed in size, the Single Entry PHR MAC CE, comprising a fourth field 904, e.g., the Power Headroom (PH), comprising second information on a power headroom.

The first information on the status of the buffer may be, e.g., a BSR.

The second information on the power headroom may be, e.g., a PHR.

In the third group of examples, the first indicator may be a fourth value in the LCID field 1002 in the MAC subheader 1001. The MAC subheader in the third group of examples may be referred to as a third subheader.

Any of the first type of message 701, the second type of message 703, and the third type of message 1200 may be a Msg3 message.

According to the types messages described, how the size of the grant may determine the selection of type of message of the first scheduled message, that is, the Msg3 format, for a CCCH payload, is illustrated in a non-limiting example in Table 3.

Table 3 illustrates the number of bytes that may be left after 6 bytes CCCH SDU may be transmitted using different grant sizes. The following cases may occur when transmitting an RRC/CCCH message of 6 bytes. Rows 2 and 3 in the table illustrate that a 7 byte grant may be sufficient to send a 6 byte CCCH according to embodiments herein, whereas according to legacy methods, a grant of size 8 would be required. The rows below rows 2 and 3 may be understood to use a 2 byte sub-header with the L field. Number of bytes left indicated in the "Bytes left" column indicates how many bytes of the grant may be unused after the 6 byte CCCH and its 2 byte subheader may be included. For example, with a grant of 10 bytes, 2 bytes are left after the 6 byte CCCH and its 2 byte header is included. These 2 bytes, the number of bytes left, are sufficient to also include an additional sub-PDU of fixed 1 byte length, e.g., a short BSR, e.g., 1 byte, +fixed 1 byte subheader.

TABLE 3

| Size of grant | LCID | MAC subheader | Bytes left | Additional MAC subPDU |
|---|---|---|---|---|
| <7 bytes | N/A | N/A | N/A | N/A |
| 7 bytes | [110110] | R/LCID | 0 | No |
| 8 bytes | [000000] | R/F/LCID/L | 0 | No |
| 9 bytes | [000000] | R/F/LCID/L | 1 | Yes, but only Padding subPDU (1 byte is too small for BSR or PHR) |
| 10 bytes | [000000] | R/F/LCID/L | 2 | Yes, but at most one (1 byte each for header/ payload) |
| 10 + n bytes, n > 0 | [000000] | R/F/LCID/L | n + 2 | |

In some embodiments, wherein the wireless device 130 may be uplink synchronized, or connected, with the network node 110, e.g., when the wireless device 130 may be waking up after for example being in inactive state, the first type of message 701 may further comprise two fields 1101 comprising an identifier of the wireless device 130 in the cell 120 wherein the wireless device 130 may be being served by the network node 110.

By selecting the type of message in this Action 601, the wireless device 130 may be enabled to flexibly adapt the type of the first scheduled message to be sent to the network node (110) according to its needs, e.g., the size of the SDU it may need to transmit. In particular, by enabling the wireless device 130 to select the first type of message in this Action 601, for example, the Msg3 size for initial access over NR may be shrunk with a factor ⅛. Furthermore, coverage may be increased. Additionally, the wireless device 130 may indicate the use case, that is, the message size, already at the transmission of Msg3.

Action 602.

In this Action 602, the wireless device 130 provides the message to be sent to the network node 110 operating in the wireless communications network 100. The message is the first scheduled message to be sent to the network node 110 in the random access procedure. The message comprises the first indicator 707 of the type of the message. The type of message has: a) the fixed size SDU 702, and b) the one byte header 704 comprising the first indicator 707 and lacking the second indicator 713 of the length of the payload.

The providing may be understood herein as preparing, constructing, or populating.

The provided message in Action 602 may be based on the selected type of message in Action 601. That is, the type of message indicated in the provided message may be based on the selected message in Action 601. Accordingly, in other examples of the method, the wireless device 130 may provide the first type of message 701, the second type of message 703, or the third type of message 1200 in a same random access procedure.

By, in this Action 602, providing the message to be sent to the network node 110 comprising the fixed size SDU, and the one byte header lacking the second indicator of the length of the payload, the wireless device 130 may be enabled to, as mentioned earlier, for example, the Msg3 size for initial access over NR may be shrunk with a factor ⅛. Furthermore, coverage may be increased. Additionally, the wireless device 130 may indicate the use case already at the transmission of Msg3.

Action 603

In this Action 603, the wireless device 130 initiates sending the provided message to the network node 110.

The initiating sending may be understood herein as triggering, starting, or enabling the sending transmitting, The sending may be performed via, e.g., the link 140.

Embodiments of method performed by the network node 110 will now be described with reference to the flowchart depicted in FIG. 13. The method may be understood to be for processing the message from the wireless device 130 served by the network node 110. The network node 110 operates in the communications network 100.

The method comprises the actions described below. One or more embodiments may be combined, where applicable. All possible combinations are not described to simplify the description. It should be noted that the examples herein are not mutually exclusive. Components from one example may be tacitly assumed to be present in another example and it ill be obvious to a person skilled in the art how those components may be used in the other examples. The detailed description of some of the following corresponds to the sane references provided above, in relation to the actions described for the wireless device 130, and will thus not be repeated here. For example, the wireless communications network 100 may operate on NR.

Action 1301

In this Action 1301, the network node 110 receives the message from the wireless device 130 operating in the wireless communications network 100. The message is the first scheduled message received by the network node 110 in the random access procedure. The message comprises the first indicator 707 of the type of the message, the type of message having: a) the fixed size SDU 702 and b) the one byte header 704 comprising the first indicator 707 and lacking the second indicator 713 of the length of the payload.

The receiving may be performed via, e.g., the link 140.

In some embodiments, the header 704 may be the MAC subheader 705, and the first indicator 707 may be the value in the LCID field 706 in the MAC subheader 705. In some particular embodiments, the value may be "110110", that is, the third value in the first type of message may be "110110".

In some embodiments, wherein the type of message is the first type of message 701 of the plurality of types of messages, the plurality of types of messages comprising the second type of message 703, the second type of message 703 may have the variable size SDU 712 and the second indicator 716 of the length of the payload.

In some embodiments, the first indicator may be a first value in the first field in a MAC subheader, the MAC subheader further comprising an LCID field, the LCID field comprising the second value. In other embodiments, the first indicator may be the third value, that is, another value, in the LCID field in the MAC subheader.

In some embodiments, wherein the type of message is the first type of message 701 of the plurality of types of messages, the plurality of types of messages may comprise the third type of message 1200. The third type of message 1200 may be fixed in size, and comprise one common subheader 1000 for: a) a fixed size Service Data Unit, SDU, 1201 and at least one of: b) the first MAC control element 800 being fixed in size, comprising: i) the second field 801 indicating the group of one or more logical channels, and ii) the third field 802 comprising the first information on the status of the buffer related to the group of the one or more logical channels; and h) the second MAC control element 900 fixed in size, comprising the fourth field 904 comprising second information on the power headroom.

In some embodiments, the first indicator may be the fourth value in the LCID field 1002 in the MAC subheader 1001.

The type of message of the received message may be based on at least one of: a) the size of the grant sent by the network node 110 to the wireless device 130 to transmit the message, b) the preamble received from the wireless device 130, and c) the grouping of the received preamble.

In some embodiments, the wireless device 130 may be uplink synchronized, or connected, with the network node 110, and the first type of message 701 may further comprise two fields 1101 comprising the identifier of the wireless device 130 in the cell 120 wherein the network node 110 may be serving the wireless device 130.

Any of the first type of message 701, the second type of message 703, and the third type of message 1200 may be a Msg3 message.

The SDU may be a MAC SDU for CCCH, which may be also referred to herein as a CCCH SDU.

Action 1302

In this Action 1302, the network node 110 initiates processing the received message, based on the first indicator 707.

The initiating processing may be understood herein as triggering, starting, or enabling the processing.

Certain embodiments disclosed herein may provide one or more of the following technical advantage(s), which may be summarized as that the Msg3 size for initial access over NR is enabled to be shrunk with a factor 1/8. Furthermore, coverage is increased. Additionally, the wireless device 130, e.g., a UE, may indicate the use case already at the transmission of Msg3. In some examples, by the wireless device 130 providing the message comprising the first indicator of the type of the message, the wireless device 130 is enabled to select the type of message that may suit its needs, without wasting resources. This is because the wireless device 130 may choose among the plurality of types of message, which comprises the first type of message, and the second type of message, and when suitable, use a fixed size SDU. Therefore, the wireless device 130 is enabled to flexibly provide the first type of message with a size shrunk by a factor of 118, and still be enabled to use other types of messages of other sizes, when needed. The first indicator in the message enables the network node 110 to be aware of the type of message received from the wireless device 130, and initiate processing it accordingly. Therefore, flexibility is conferred to the wireless device 130 during random access, and the possibility of saving resources is enabled, increasing the capacity of the wireless communications network, reducing latency, and increasing coverage.

Figure 14:
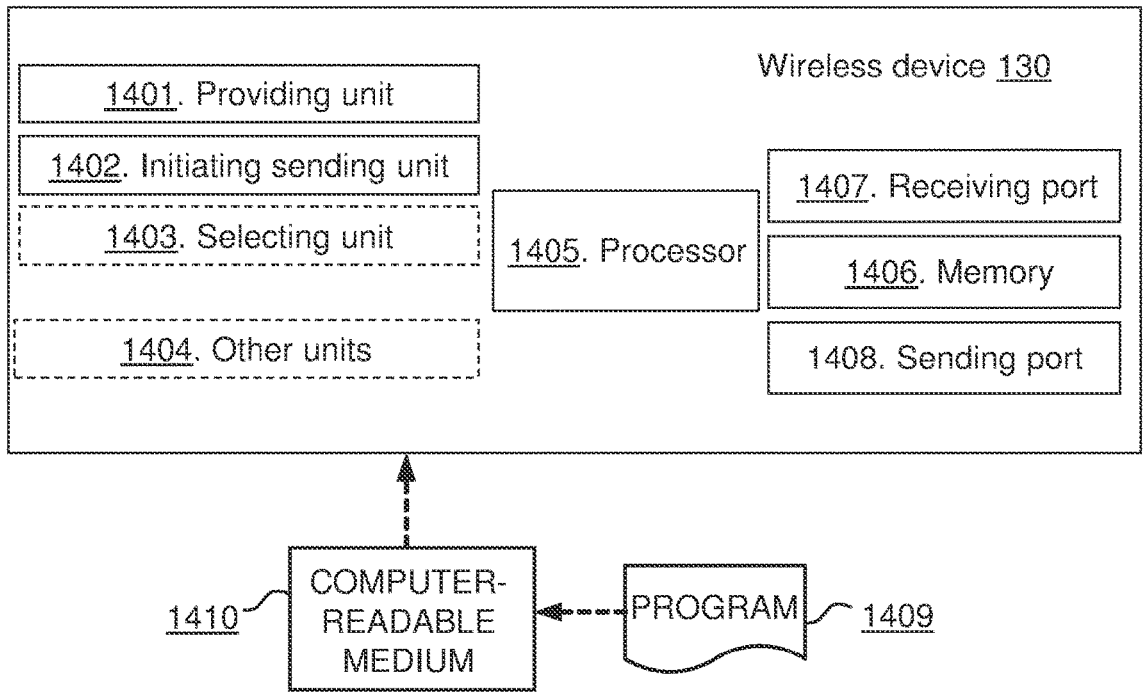
FIG. 14 is a schematic block diagram illustrating two non-limiting examples, a) and b), of a wireless device, according to embodiments herein.
Figure 14:
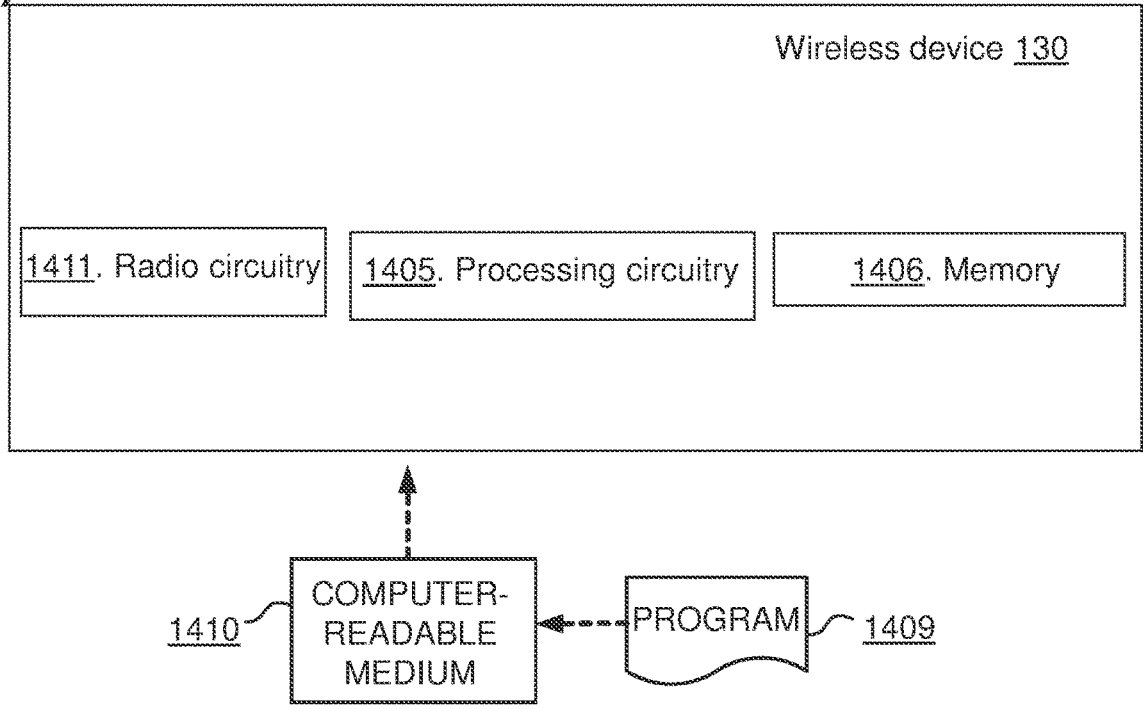

FIG. 14 depicts two different examples in panels a) and b), respectively, of the arrangement that the wireless device 130 may comprise to perform the method actions described above in relation to FIG. 6. The wireless device 130 is configured to operate in the wireless communications network 100

The detailed description of some of the following corresponds to the same references provided above, in relation to the actions described for the wireless device 130, and will thus not be repeated here. For example, the wireless communications network 100 may be configured to operate on NR. In FIG. 14, optional units are indicated with dashed boxes.

In some embodiments, the wireless device 130 may comprise the following arrangement depicted in FIG. 14a.

The wireless device 130 is configured to perform the providing of Action 602, e.g., by means of a providing unit 1401 within the wireless device 130, configured to provide the message to be sent to the network node 110 configured to operate in the wireless communications network 100. The message is the first scheduled message to be sent to the network node 110 in the random access procedure. The message comprises the first indicator 707 of the type of the message. The type of message has: a) the fixed sire SDU 702 and b) the one byte header 704 comprising the first indicator 707 and lacking the second indicator 713 of the length of the payload. The providing unit 1401 may be a processor 1405 of the wireless device 130, or an application running on such processor.

In some embodiments, the header 704 may be the MAC subheader 705, and the first indicator 707 may be a value in an LCID field 706 in the MAC subheader 705.

In some embodiments, the value may be "110110".

The type of message mar be the first type of message 701 of the plurality types of messages. The plurality of types of messages may comprise the second type of message 703, the second type of message 703 having the variable size SDU 712 and the second indicator 716 of the length of the payload.

In some embodiments, the first indicator may be the first value in the first field in the MAC subheader, the MAC subheader further comprising an LCID field, the LCID field comprising the second value.

In some embodiments, the type of message may be the first type of message 701 of the plurality of types of messages, the plurality of types of messages comprising the third type of message 1200. The third type of message 1200 may be fixed in size, and comprise one common subheader 1000 for: a) the fixed size SDU 1201 and at least one of: b) the first MAC control element 800 being fixed in size, comprising: i) the second field 801 indicating the group of one or more logical channels, and ii) the third field 802 comprising the first information on the status of the buffer related to the group of the one or more logical channels; and c) the second MAC control element 900 fixed in size, comprising the fourth field 904 comprising the second information on the power headroom.

In some embodiments, the first indicator may be the fourth value in the LCID field 1002 in the MAC subheader 1001.

In some embodiments, wherein the wireless device 130 may be configured to be uplink synchronized, or connected, with the network node 110, the first type of message 701 may further comprise the two fields comprising the identifier of the wireless device 130 in the cell 120 wherein the wireless device 130 may be configured to be being served by the network node 110.

Any of the first type of message 701, the second type of message 703, and the third type of message 1200 may be a Msg3 message.

The SDU may be a MAC SDU for CCCH.

The wireless device 130 may be configured to perform the initiating sending of Action 603, by means of an initiating sending unit 1402 within the wireless device 130, configured to initiate sending the provided message to the network node 110. The initiating sending unit 1402 may be the processor 1405 of the wireless device 130, or an application running on such processor.

The wireless device 130 may be further configured to perform the selecting of Action 601, e.g., by means of a selecting unit 1403 within the wireless device 130, configured to select, the type of the message to be sent to the network node 110. To select the type of message may be based on at least one of: a) the size of the grant received from the network node 110 to transmit the message, b) the preamble sent by the wireless device 130, and c) the grouping of the sent preamble. The selecting unit 1403 may be the processor 1405 of the wireless device 130, or an application running on such processor.

Other units 1404 may be comprised in the wireless device 130.

The embodiments herein in the wireless device 130 may be implemented through one or more processors, such as a processor 1405 in the wireless device 130 depicted in FIG. 14a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 1406 comprising one or more memory units. The memory 1406 is arranged to be used to store obtained information, store data, configurations, schedulings, and applications etc. to perform the methods herein when being executed in the wireless device 130.

In some embodiments, the wireless device 130 may receive information from, e.g., the network node 110, through a receiving port 1407. In some embodiments, the receiving port 1407 may be, for example, connected to one or more antennas in wireless device 130. In other embodiments, the wireless device 130 may receive information from another structure in the wireless communications network 100 through the receiving port 1407. Since the receiving port 1407 may be in communication with the processor 1405, the receiving port 1407 may then send the received information to the processor 1405. The receiving port 1407 may also be configured to receive other information.

The processor 1405 in the wireless device 130 may be further configured to transmit or send information to e.g., the network node 110, another structure in the wireless communications network 100, through a sending port 1408, which may be in communication with the processor 1405, and the memory 1406.

Those skilled in the art will also appreciate that the providing unit 1401, the initiating sending unit 1402, the selecting unit 1403 and the other units 1404 described above may refer to a combination of analog and digital circuits, and/or one or more processors configured with software and/or firmware, e.g., stored in memory, that, when executed by the one or more processors such as the processor 1405, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different circuits 1401-1404 described above may be implemented as one or more applications running on one or more processors such as the processor 1405.

Thus, the methods according to the embodiments described herein for the wireless device 130 may be respectively implemented by means of a computer program 1409 product, comprising instructions, i.e., software code portions, which, when executed on at least one processor 1405, cause the at least one processor 1405 to carry out the actions described herein, as performed by the wireless device 130. The computer program 1409 product may be stored on a computer-readable storage medium 1410. The computer-readable storage medium 1410, having stored thereon the computer program 1409, may comprise instructions which, when executed on at least one processor 1405, cause the at least one processor 1405 to carry out the actions described herein, as performed by the wireless device 130. In some embodiments, the computer-readable storage medium 1410 may be a non-transitory computer-readable storage medium, such as a CD ROM disc, or a memory stick. In other embodiments, the computer program 1409 product may be stored on a carrier containing the computer program 1409 just described, wherein the carrier is one of an electronic signal, optical signal, radio signal, or the computer-readable storage medium 1410, as described above.

The wireless device 130 may comprise a communication interface configured to facilitate communications between the wireless device 130 and other nodes or devices, e.g., the network node 110. The interface may, for example, include a transceiver configured to transmit and receive radio signals over an air interface in accordance with a suitable standard.

In other embodiments, the wireless device 130 may comprise the following arrangement depicted in FIG. 14*b*. The wireless device 130 may comprise a processing circuitry 1405, e.g., one or more processors such as the processor 1405, in the wireless device 130 and the memory 1406. The wireless device 130 may also comprise a radio circuitry 1411, which may comprise e.g., the receiving port 1407 and the sending port 1408. The processing circuitry 1405 may be configured to, or operable to, perform the method actions according to FIG. 6, and/or FIGS. 17-21, in a similar manner as that described in relation to FIG. 14*a*. The radio circuitry 1411 may be configured to set up and maintain at least a wireless connection with the wireless device 130. Circuitry may be understood herein as a hardware component.

Hence, embodiments herein also relate to the wireless device 130 operative to operate in the wireless communications network 100. The wireless device 130 may comprise the processing circuitry 1405 and the memory 1406, said memory 1406 containing instructions executable by said processing circuitry 1405, whereby the wireless device 130 is further operative to perform the actions described herein in relation to the wireless device 130, e.g., in FIG. 6, and/or FIGS. 17-21.

In some embodiments, wireless device 130 is further operative to provide the message to be sent to a network node 110 comprised in the wireless communications network 100. The message is the first scheduled message to be sent to the network node 110 in the random access procedure. The message comprises the first indicator 707 of the type of the message. The type of message has: a) the fixed size SDU 702 and b) the one byte header 704 comprising the first indicator 707 and lacking the second indicator 713 of the length of the payload. The wireless device 130 is also operative to initiate sending the provided message to the network node 110.

Figure 15:
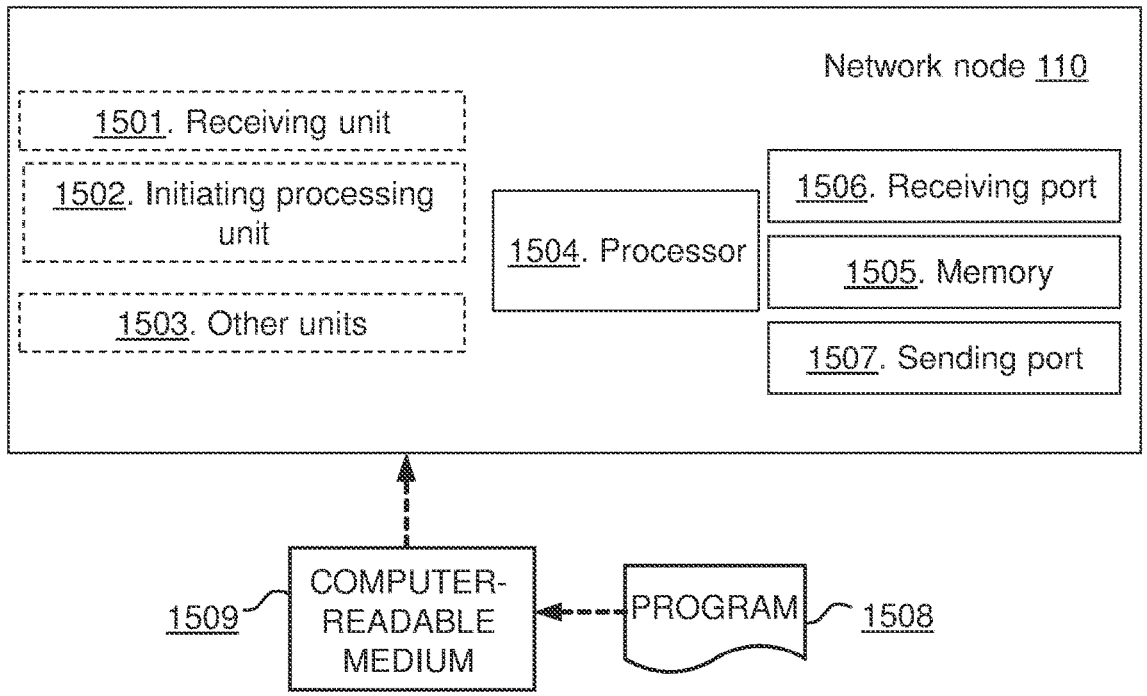
FIG. 15 is a schematic block diagram illustrating two non-limiting examples, a) and b), of a network node, according to embodiments herein.
Figure 15:
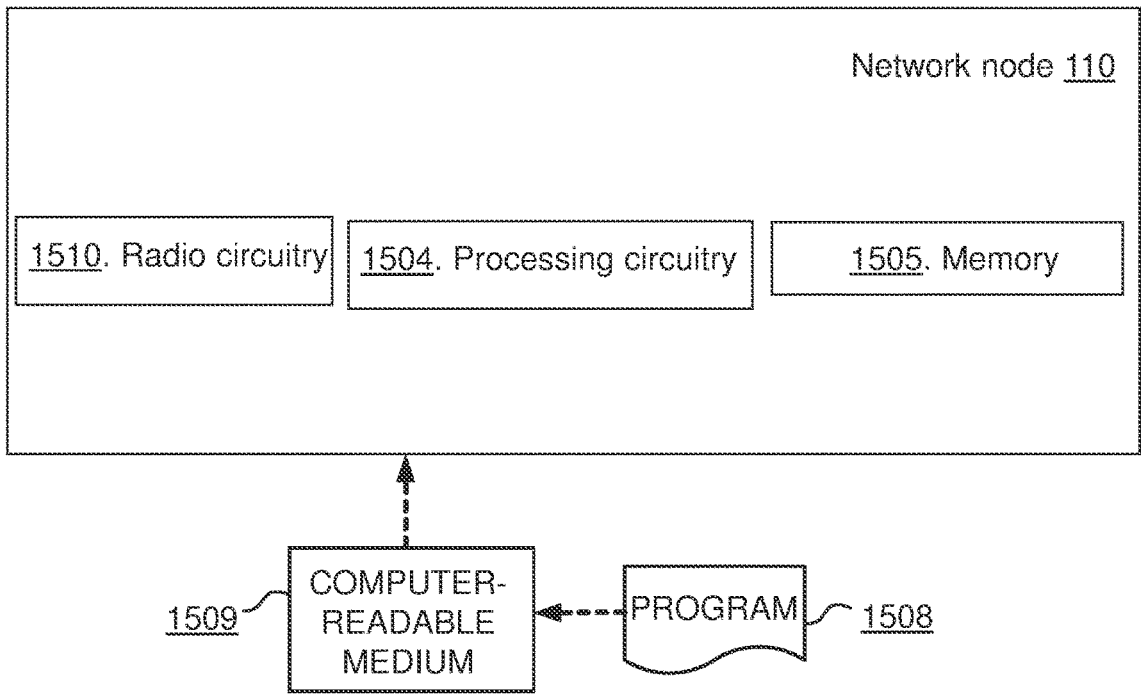

FIG. 15 depicts two different examples in panels a) and b), respectively, of the arrangement that the network node 110 may comprise to perform the method actions described above in relation to FIG. 13. In some embodiments, the network node 110 may comprise the following arrangement depicted in FIG. 15*a*.

The network node 110 is configured to operate in the communications network 100.

The detailed description of some of the following corresponds to the same references provided above, in relation to the actions described for the wireless device 130, and will thus not be repeated here. For example, the wireless communications network 100 may be configured to operate on NR. In FIG. 15, optional units are indicated with dashed boxes.

The network node 110 may be configured to perform the receiving of Action 701, e.g., by means of a receiving unit 1501 within the network node 110, configured to receive the message from the wireless device 130 configured to operate in the wireless communications network 100. The message is the first scheduled message received by the network node 110 in the random access procedure. The message comprises the first indicator 707 of the type of the message. The type of message has: a) the fixed size SDU 702 and b) the one byte header 704 comprising the first indicator 707 and lacking the second indicator 713 of the length of the payload. The receiving unit 1501 may be a processor 1504 of the network node 110, or an application running on such processor.

The network node 110 may be configured to perform the initiating processing of Action 702, by means of an initiating processing unit 1502 within the network node 110, configured to initiate processing the received message, based on the first indicator 707. The initiating processing unit 1502 may be the processor 1504 of the network node 110, or an application running on such processor.

Other units 1503 may be comprised in the network node 110.

In some embodiments, the header 704 may be the MAC subheader 705, and the first indicator 707 may be a value in a LCID field in the MAC subheader 705.

The value may be "110110".

In some embodiments, the type of message may be the first type of message 701 of the plurality of types of messages. The plurality of types of messages may comprise the second type of message 703. The second type of message 703 may have the variable size SDU 712 and the second indicator 716 of the length of the payload.

In some embodiments, the first indicator may be the first value in the first field in the MAC subheader, the MAC subheader further comprising the LCID field, the LCID field comprising the second value.

In some embodiments, wherein the type of message may be the first type of message 701 of the plurality of types of messages, the plurality of types of messages may comprise the third type of message 1200. The third type of message 1200 may be fixed in size, and comprise one common subheader 1000 for: a) the fixed size SDU 1201 and at least one of: b) the first MAC control element 800 being fixed in size, comprising: i) the second field 801 indicating the group of one or more logical channels, and ii) the third field 802 comprising the first information on the status of the buffer related to the group of the one or more logical channels; and c) the second MAC control element 900 fixed in size, comprising the fourth field comprising the second information on the power headroom.

In some embodiments, the first indicator may be the fourth value in a LCID field 1002 in a MAC subheader 1001.

The type of message of the received message may be based on at least one of: a) the size of the grant sent by the network node 110 to the wireless device 130 to transmit the message, b) the preamble received from the wireless device 130, and c) the grouping of the received preamble.

In some embodiments, wherein the wireless device 130 may be configured to be uplink synchronized, or connected, with the network node 110, the first type of message 701 may further comprise two fields comprising the identifier of the wireless device 130 in the cell 120 herein the network node 110 may be configured to be serving the wireless device 130.

Any of the first type of message 701, the second type of message 703, and the third type of message 1200 may be a Msg3 message.

The SDU may be a MAC SDU for CCCH.

The embodiments herein in the network node 110 may be implemented through one or more processors, such as a processor 1504 in the network node 110 depicted in FIG. 15a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1505 comprising one or r more memory units. The memory 1505 is arranged to be used to store obtained information, store data, configurations, schedulings, and applications etc. to perform the methods herein when being executed in the network node 110.

In some embodiments, the network node 110 may receive information from, e.g., the wireless device 130, through a receiving port 1506. In some embodiments, the receiving port 1506 may be, for example, connected to one or more antennas in network node 110. In other embodiments, the network node 110 may receive information from another structure in the wireless communications network 100 through the receiving port 1506. Since the receiving port 1506 may be in communication with the processor 1504, the receiving port 1506 may then send the received information to the processor 1504. The receiving port 1506 may also be configured to receive other information.

The processor 1504 in the network node 110 may be further configured to transmit or send information to e.g., the wireless device 130, another structure in the wireless communications network 100, through a sending port 1507, which may be in communication with the processor 1504, and the memory 1505.

Those skilled in the art will also appreciate that the receiving unit 1501, the initiating processing unit 1502, and the other units 1503 described above may refer to a combination of analog and digital circuits, and/or one or more processors configured with software and/or firmware, stored in memory, that, when executed by the one or more processors such as the processor 1504, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1501-1503 described above may be implemented as one or more applications running on one or more processors such as the processor 1504.

Thus, the methods according to the embodiments described herein for the network node 110 may be respectively implemented by means of a computer program 1508 product, comprising instructions, i.e., software code portions, which, when executed on at least one processor 1504, cause the at least one processor 1504 to carry out the actions described herein, as performed by the network node 110. The computer program 1508 product may be stored on a computer-readable storage medium 1509. The computer-readable storage medium 1509, having stored thereon the computer program 1508, may comprise instructions which, when executed on at least one processor 1504, cause the at least one processor 1504 to carry out the actions described herein, as performed by the network node 110. In some embodiments, the computer-readable storage medium 1509 may be a non-transitory computer-readable storage medium, such as a CD ROM disc, or a memory stick. In other embodiments, the computer program 1508 product may be stored on a carrier containing the computer program 1508 just described, wherein the carrier is one of an electronic signal, optical signal, radio signal, or the computer-readable storage medium 1509, as described above.

The network node 110 may comprise a communication interface configured to facilitate communications between the network node 110 and other nodes or devices, e.g., the wireless device 130. The interface may, for example, include a transceiver configured to transmit and receive radio signals over an air interface in accordance with a suitable standard.

In other embodiments, the network node 110 may comprise the following arrangement depicted in FIG. 15b. The network node 110 may comprise a processing circuitry 1504, e.g., one or more processors such as the processor 1504, in the network node 110 and the memory 1505. The network node 110 may also comprise a radio circuitry 1510, which may comprise e.g., the receiving port 1506 and the sending port 1507. The processing circuitry 1504 may be configured to, or operable to, perforin the method actions according to FIG. 7, and/or FIGS. 17-21, in a similar manner as that described in relation to FIG. 15a. The radio circuitry 1510 may be configured to set up and maintain at least a wireless connection with the network node 110. Circuitry may be understood herein as a hardware component.

Hence, embodiments herein also relate to the network node 110 operative to operate in the wireless communications network 100. The network erode 110 may comprise the processing circuitry 1504 and the memory 1505, said memory 1505 containing instructions executable by said processing circuitry 1504, whereby the network node 110 is further operative to perform the actions described herein in relation to the network node 110, e.g., FIG. 13, and/or FIGS. 17-21.

In some embodiments, the network node 110 is further operative to receive the message from the wireless device 130 comprised in the wireless communications network 100. The message is the first, scheduled message received by the network node 110 in the random access procedure. The message comprises the first indicator 707 of the type of the message. The type of message has: a) the fixed size SDU 702 and b) the one byte header 704 comprising the first indicator 707 and lacking the second indicator 713 of the length of the payload. The network mode 110 is also operative to initiate processing the received message, based on the first indicator 707.

Further examples related to embodiments herein

A first aspect of examples related to embodiments herein relates to a method, performed by the wireless device 130 and is described herein. The method may be understood to be for providing a message to be sent to the network node 110 serving the wireless device 130. The wireless device 130 and the network node 110 operate in the wireless communications network 100. The method may comprise the following actions:

Providing 602 a message to be sent to the network node 110, the message being a first scheduled message to be sent to the network node 110 in a random access procedure, the message comprising a first indicator of a type of the message of a plurality of types of messages, the plurality of types of messages comprising:
i. a first type of message, the first type of message having a fixed size Service Data Unit (SDU), and a one byte header lacking a second indicator of the length of the payload, and
ii. a second type of message, the second type of message having a variable size SDU and the second indicator of the length of the payload.

Initiating sending 603 the provided message to the network node 110.

A second aspect of examples related to embodiments herein relates to a method, performed by the network node 110 is described herein. The method may be understood to be for processing the message from the wireless device 130 served by the network node 110. The wireless device 130 and the network node 110 may operate in the wireless communications network 100. The method may comprise the following actions:

Receiving 1301 the message from the wireless device 130, the message being the first scheduled message received by the network node 110 in the random access procedure. The message comprises the first indicator of the type of the message of the plurality of types of messages. The plurality of types of messages comprises:
i. the first type of message, the first type of message having the fixed size Service Data Unit, SDU, and the one byte header lacking the second indicator of the length of the payload, and
ii. the second type of message, the second type of message having the variable size SIMI and the second indicator of the length of the payload.

Initiating processing 702 the received message, based on the first indicator.

Particular examples related to embodiments herein:
1. A method, performed by a wireless device (130), for providing a message to be sent to a network node (110) serving the wireless device (130), the wireless device (130) and the network node (110) operating in a wireless (communications network (100), the method comprising:
   providing (602) a message to be sent to the network node (110), the message being a first scheduled message to be sent to the network node (110) in a random access procedure, the message comprising a first indicator of a type of the message of a plurality of types of messages, the plurality of types of messages comprising:
   a) a first type of message, the first type of message having a fixed size Service Data Unit, SDU, and a one byte header lacking a second indicator of the length of the payload, and
   b) a second type of message, the second type of message having a variable size SDU and the second indicator of the length of the payload, and
   initiating sending (603) the provided message to the network node (110).
2. The method according to example 1, wherein the first indicator is a first value in a first field in a Medium Access Control, MAC, subheader, the MAC subheader further comprising a Logical Channel Identity, LCID, field, the LCID field comprising a second. value.
3. The method according to example 1, wherein the first indicator is a third value in a LCID field in a MAC subheader,
4. The method according to example 3, wherein the third value in the first type of message is "110110".
5. The method according to example 1, wherein the plurality of types of messages comprises a third type of message, the third type of message being fixed in size, and comprising one common subheader for:
   a. a fixed size Service Data Unit, SDU, and at least one of:
   b. a first MAC control element being fixed in size, comprising:
      i. a second field indicating a group of one or more logical channels, and
      ii. a third field comprising first information on a status of a buffer related to the group of the one or more logical channels; and
   c. a second MAC control element fixed in size, comprising a fourth field comprising second information on a power headroom.
6. The method according to example 5, wherein the first indicator is a fourth value in a LCID field in a MAC subheader.

7. The method according to any of examples 1-6, further comprising:
   selecting (601), the type of the message to be sent to the network node (110), the selecting (601) the type of message being based on at least one of: a size of a grant received from the network node (110) to transmit the message, b) a preamble sent by the wireless device (130), and c) a grouping of the sent preamble.
8. The method according to any of examples 1-7, wherein the wireless device (130) is uplink synchronized, or connected, with the network node (110), and wherein the first type of message further comprises two fields comprising an identifier of the wireless device (130) in a cell (120) wherein the wireless device (130) is being served by the network node (110).
9. The method according to any of examples 1-8, wherein any of the first type of message, the second type of message, and the third type of message is a Msg3 message.
10. The method according to any of examples 1-9, wherein the wireless communications network (100) operates on New Radio, NR.
11. A method, performed by a network node (110), for processing a message from a wireless device (130) served by the network node (110), the wireless device (130) and the network node (110) operating in a wireless communications network (100), the method comprising:
   receiving (701) a message from the wireless device (130), the message being a first scheduled message received by the network node (110) in a random access procedure, the message comprising a first indicator of a type of the message of a plurality of types of messages, the plurality of types of messages comprising:
      a) a first type of message, the first type of message having a fixed size Service Data Unit, SDU, and a one byte header lacking a second indicator of the length of the payload, and
      b) a second type of message, the second type of message having a variable size SDU and the second indicator of the length of the payload, and
   initiating processing (702) the received message, based on the first indicator.
12. The method according to example 11, wherein the first indicator is a first value in a first field in a Medium Access Control, MAC, subheader, the MAC subheader further comprising a Logical Channel Identity, LCID, field, the LOD field comprising a second value.
13. The method according to example 12, wherein the first indicator is a third value in a Ulf) field in a MAC subheader,
14. The method according to example 13, wherein the third value in the first type of message is "110110".
15. The method according to example 11, wherein the plurality of types of messages comprises a third type of message, the third type of message being fixed in size, and comprising one common subheader for:
   a. a fixed size Service Data Unit, SDU, and at least one of:
   b. a first MAC control element being fixed in size, comprising:
      i. a second field indicating a group of one or more logical channels, and
      ii. a third field comprising first information on a status of a buffer related to the group of the one or more logical channels; and
   c. a second MAC control element fixed in size, comprising a fourth field comprising second information on a power headroom.
16. The method according to example 15, wherein the first indicator is a fourth value in a LCID field in a MAC subheader.
17. The method according to any of examples 11-16, wherein the type of message of the received message is based on at least one of: a size of a grant sent by the network node (110) to the wireless device (130) to transmit the message, b) a preamble received from the wireless device (130), and c) a grouping of the received preamble.
18. The method. according to any of examples 11-17, wherein the wireless device (130) is uplink synchronized, or connected, with the network node (110), and wherein the first type of message further comprises two fields comprising an identifier of the wireless device (130) in a cell (120) wherein the network node (110) is serving the wireless device (130).
19. The method according to any of examples 11-18, wherein any of the first type of message, the second type of message, and the third type of message is a Msg3 message.
20. The method according to any of examples 11-19, wherein the wireless communications network (100) operates on New Radio, NR.

Further discussion on some aspects herein

Some aspects of embodiments herein may be understood to relate to the size of Msg3 in NR when it may be used to carry CCCH payload and the corresponding grant size that may be needed to handle the Msg3 transmission. A more detailed discussion of the message content in various cases is found in R2-1801162 Size of MSG3 in NR, Ericsson, 3GPP TSG-RAN #NR AH1801, Jan. 22-26, 2018.

The size of the transport block may be understood to be limited by the number of bits that pray be reliably delivered to a UE at the cell edge. It may therefore be desirable to be able to use as small message size as possible. For LTE, the minimum grant size is 56 bits.

As described in Ericsson, 3GPP TSG-RAN #NR AH1801, Jan. 22-26, 2018, the size of the RRC messages may be given by
   1. RRC Connection Request: 46 bits
   2. RRC Resume Request: 81 bits
   3. RRC Connection re-establishment request 43 bits It may be noted that the above values are indicative and not decided yet. In addition to this, a MAC subheader of 2 bytes (RJF/LCIDIL) may be added to the Msg3 size. The size of the grants may be understood to be octet aligned, which may result in that the minimum size of the grant for Msg3 may be 8 bytes, for RRC Connection Request, 13 bytes for RRC Resume Request and 8 bytes for RRC Connection re-establishment request.

According to the foregoing, a grant of 8 bytes may be the minimum for transmission of RRC Connection Request or RRC Connection re-establishment request. Also, a grant of 13 bytes may be the minimum for transmission of RRC Resume Request.

Using the minimum size grant may be understood to be useful in cases where there may be no extra MAC CEs needed for better performance. For example, BSR and PHR may be useful in case of RRC Resume Request, but less useful in case of the RRC Connection Request or the RRC Connection re-establishment request. One way to handle grant assignment may be to use a minimum grant for CBRA using preamble group A, i.e., setting the ra-Msg3Size Group A to the minimum grant size. If a UE wishes to transmit a Msg3 larger than the minimum grant size, it may need to use preamble group B which may be understood to use a larger grant. Preamble group B may then handle cases requiring a larger grant such as RRC Resume Request. Using Preamble group B may also be understood to require that the pathloss is low enough or that it is the LTE parameter message Power Offset Group B is used also in NR and may be configured to handle the larger Msg3 sizes irrespective of pathloss. An alternative solution may be to allow selection of preamble group B ignoring the pathloss for CCCH transmissions as in LTE and suggested in R2-1800965, Clarification on to Preamble group B selection, Nokia, NTT DOCOMO, Nokia Shanghai, 3GPP TSG-RAN #NR AH1801, Jan. 22-26, 2018. Selection of preamble group B may be allowed in some examples, ignoring the pathloss requirement for CCCH transmissions.

The MAC subheader used for the RRC Connection Request and RRC Connection re-establishment request may use the two bytes format according to the current specification. This header format as shown in FIG. 10.

This may be understood to reduce the size of the MAC subheader by one byte and make it possible to fit the Msg3 transmission with a 7 byte grant.

According to the foregoing, if a fixed format for the MAC header is used, a grant of 7 bytes may be sufficient for transmission of RRC Connection Request or RRC Connection re-establishment request.

The saving of one byte would be very beneficial for Msg3 transmissions and therefore, the R/LCID MAC subheader may be used for Msg3 transmission of RRC Connection Request and RRC Connectionre-establishment, request, Using the R/LCID MAC subheader for RRC Connection Request or RRC Connection re-establishment request In the current version of 38.321, transmission of RRC Connection Request or RRC Connection re-establishment request may be done by encapsulating the CCCH SDU with a RIF/LOD/L. MAC subheader with 8-bit L field. In this case, R=0, F=0 to indicate 8 bit length field, LCID=000000 to indicate CCCH, and L is the length of the CCCH SDU.

Using the method of using R/LCIDSDU MAC subheader for Msg3, indication of the CCCHSDU for RRC Connection Request or RRC Connection re-establishment request may instead be indicated with R!LCID MAC subheader. One way to do this may be to select one of the reserved LCID values to indicate a CCCH SDU of a fixed size. For example, LCID=110110 may refer to a CCCH SDU of 6 bytes. In this way, the RRC Connection Request or RRC Connection re-establishment request ay be transmitted using a grant of 7 bytes.

According to the foregoing, the reserved LCID value 110110 may be used to indicate a CCCH SDU of 6 bytes, With such a method, the following situation when transmitting an RRC message of 6 bytes may occur:

TABLE 4

Number of bytes left after 6 bytes CCCH SDU transmitted using different grant sizes.

| Size of grant | MAC subheader for CCCH SDU | Bytes left after CCCH SDU and its subheader | Additional MAC subPDU | Comment |
| --- | --- | --- | --- | --- |
| <7 bytes | N/A | N/A | N/A | Too small grant |
| 7 bytes | R/R/LCID | 0 | No | Smallest size, new reserved LCID |
| 8 bytes | R/F/LCID/L | 0 | No | Works with legacy LCID = 000000 |
| 9 bytes | R/F/LCID/L | 1 | Yes, but only padding since 1 byte is too small for BSR or PHR. | Padding is included as a result of multiplexing. LCID = 000000 |
| 9 + n bytes, n > 0 | R/F/LCID/L | n + 1 | Ordinary multiplexing | LCID = 000000 |

Further Extensions And Variations

Figure 16:
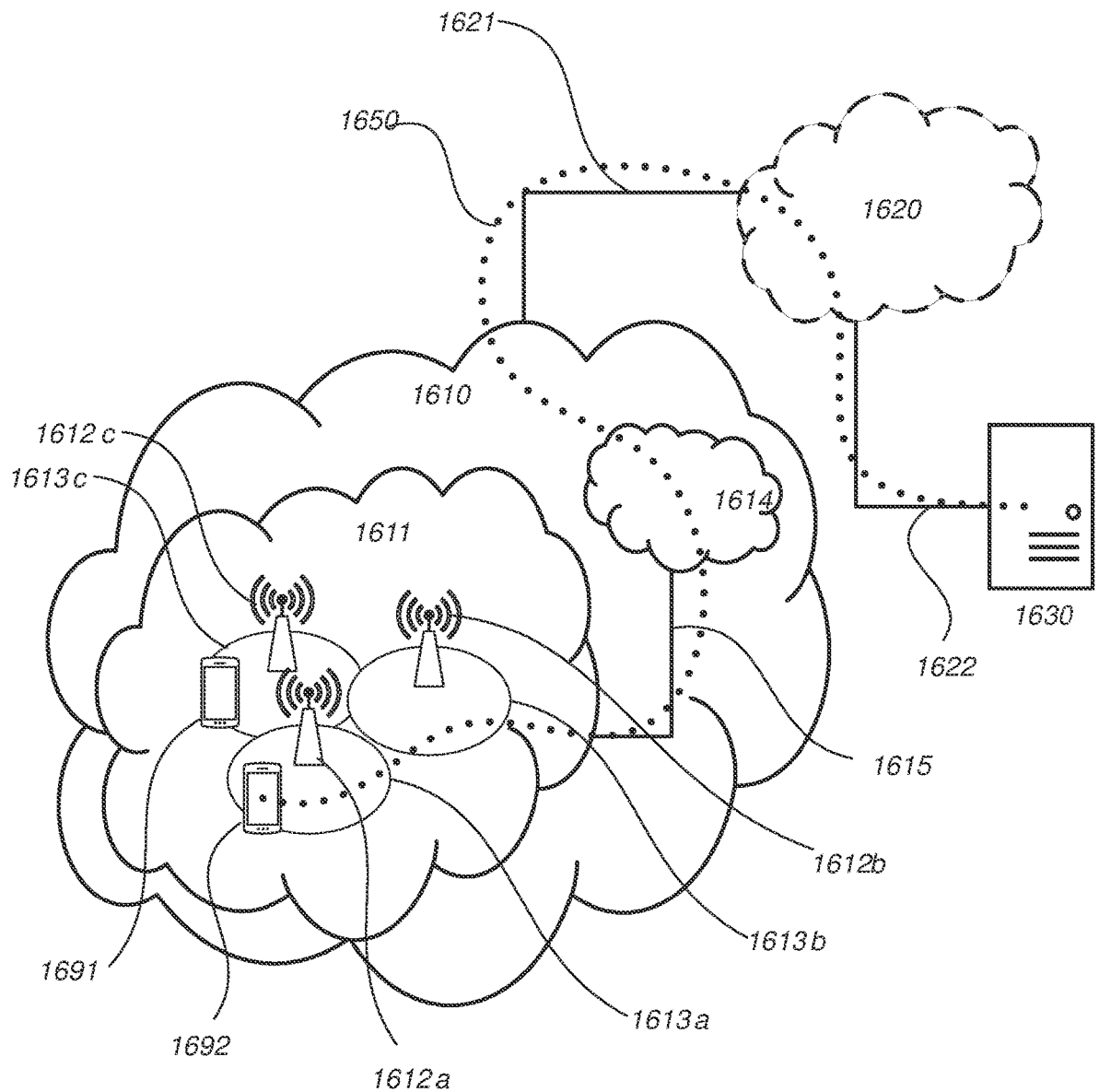
FIG. 16 is a schematic block diagram illustrating a tele communication network connected via an intermediate network to a host computer, according to embodiments herein.

FIG. 16: Telecommunication network connected via an intermediate network to a host computer in accordance with some embodiments With reference to FIG. 16, in accordance with an embodiment, a communication system includes telecommunication network 1610 such as the wireless communications network 100, for example, a GPP-type cellular network, which comprises access network. 1611 such as a radio access network, and core network 1614. Access network 1611 comprises a plurality of network nodes such as the network node 110. For example, base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. In FIG. 16, a first UE 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612. Any of the UEs 1691, 1692 may be considered examples of the wireless device 130.

Telecommunication network 1610 is itself connected to host computer 1630, which may lie embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and down communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the fun are routing of an outgoing uplink communication originating from the UE 1691 towards the host computer 1630.

In relation to FIGS. 17, 18, 19, 20, and 21, which are described next, it may be understood that a UE is an example of the wireless device 130, and that any description provided for the UE equally applies to the wireless device 130. It may be also understood that the base station may be considered an example of the network node 110, and that any description provided for the base station equally applies to the network node 110.

Figure 17:
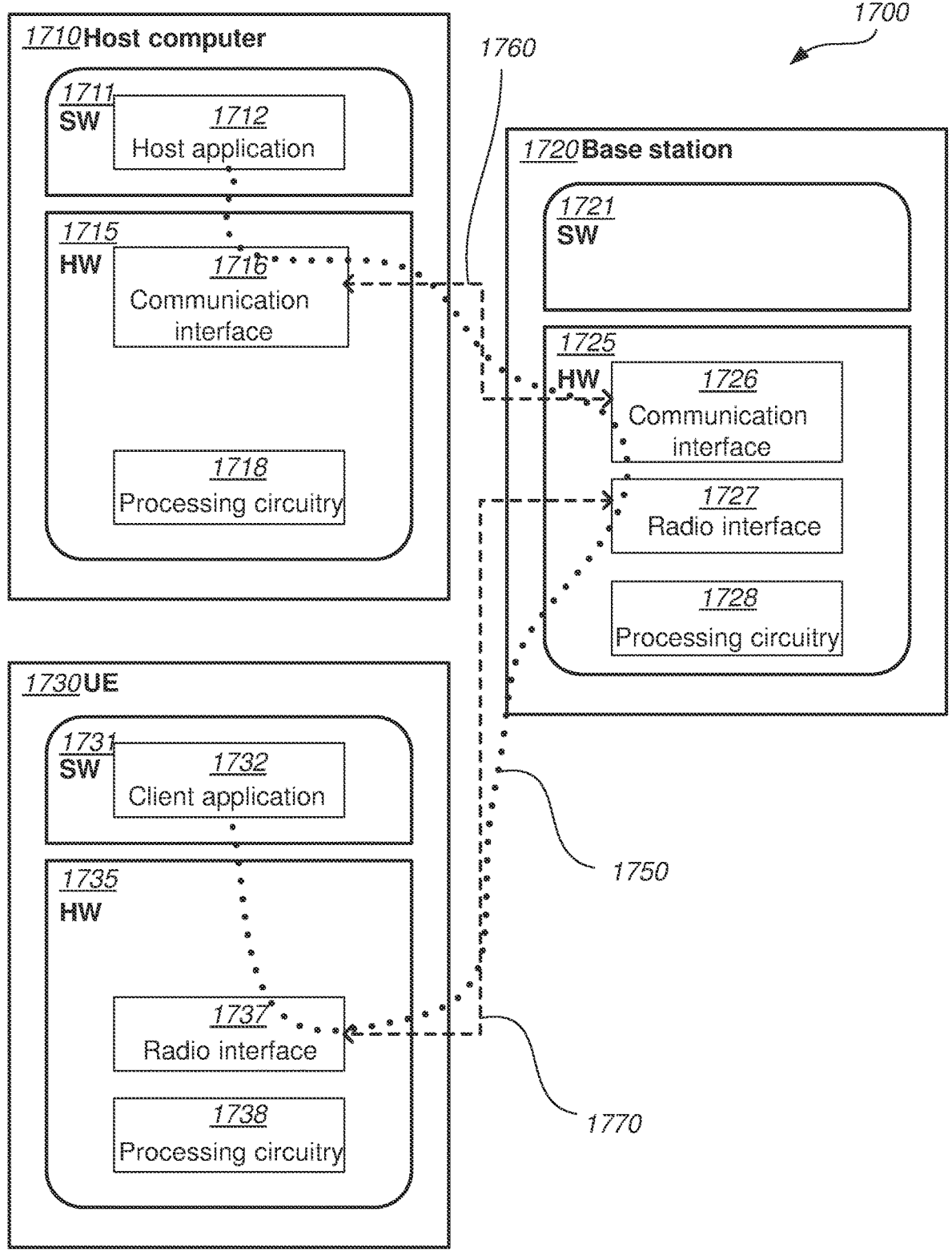
FIG. 17 is a generalized block diagram of a host computer communicating via a base station with a user equipment over a partially wireless connection, according to embodiments herein.

FIG. 17: Host computer communicating via a base station with a user equipment over a partially wireless connection accordance with some embodiments Example implementations, in accordance with an embodiment, of the wireless device 130, e.g., a UE, and the network node 110, e.g., a base station and host computer discussed in the preceding paragraphs will now be described with reference to FIG. 17. In communication system 1700, such as the wireless communications network 100, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions, Host computer 1710 farther comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes the network node 110, exemplified in FIG. 17 as a base station 1720 provided in a telecommunication system and comprising hardware 1725 enabling it to communicate with host computer 1710 and with UE 1730, Hardware 1725 may include communication interface 1726 for setting up and maintaining a wired or wireless connection with an interface of a different communication device of communication system1700, as well as radio interface 1727 for setting up and maintaining at least wireless connection 1770 with the wireless device 130, exemplified in FIG. 17 as a UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. Its hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612*a*, 1612*b*, 1612*c* and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network), Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the teachings of these embodiments may improve the spectrum efficiency, coverage, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

The wireless device 130 may comprise an arrangement as shown in FIG. 14 or in FIG. 17.

The wireless device 130 may comprise an interface unit to facilitate communications between the wireless device 130 and other nodes or devices, e.g., the network node 110, the host computer 1710, or any of the other nodes. In some particular examples, the interface may, for example, include a transceiver configured to transmit and receive radio signals over an air interface in accordance with a suitable standard.

The wireless device 130 may also comprise a client application 1732 or a client application unit, which may be configured to communicate user data with a host application unit in a host computer 1710, e.g., via another link such as 1750.

The network node 110 may comprise an arrangement as shown in FIG. 15 or in FIG. 17.

The network node 110 may comprise an interface unit to facilitate communications between the network node 110 and other nodes or devices, e.g., the wireless device 130, the host computer 1710, or any of the other nodes. In some particular examples, the interface may, for example, include a transceiver configured to transmit and receive radio signals over an air interface in accordance with a suitable standard.

The network node 110 may also comprise a communication interface 1726 or a radio interface 1727, which may be configured to communicate user data with a host application unit in a host computer 1710, e.g., via another link such as 1750.

FIG. 18: Methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

FIG. 19: Methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the TIE receives the user data carried in the transmission.

FIG. 20: Methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020 the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data be host computer. In step 2040 of the method, the host computer receives the user data transmitted from the UE, in accordance with the teachings of the embodiments described throughout this disclosure.

FIG. 21: Methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus pray comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data. communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The wireless device 130 embodiments relate to FIG. 6, FIG. 14, and FIGS. 17-21.

The network node 110 embodiments relate to FIG. 7, FIG. 15, and FIGS. 17-21.

Further Numbered Embodiments

1. A base station configured to communicate with a user equipment (UE), the base station comprising a radio interface and processing circuitry configured to perform one or more of the actions described herein as performed by the network node 110.
5. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform one or more of the actions described herein as performed by the network node 110.
6. The communication system of embodiment 5, further including the base station.
7. The communication system of embodiment 6, further including the UE, wherein the UE is configured to communicate with the base station.
8, The communication system of embodiment 7, wherein:
    the processing circuitry of the host computer is configured to execute a host application, thereby providing the user data; and
    the UE comprises processing circuitry configured to execute a client application associated with the host application.
11. A method implemented in a base station, comprising one or more of the actions described herein as performed by the network node 110.
15. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs one or more of the actions described herein as performed by the network node 110.
16. The method of embodiment 15, further comprising:
    at the base station, transmitting the user data.
17. The method of embodiment 16, wherein the user data is provided at the host computer by executing a host application, the method further comprising:
    at the UE, executing a client application associated with the host application.
21. A user equipment (LIE) configured to communicate with a base station, the LIE comprising a radio interface and processing circuitry configured to perform one or more of the actions described herein as performed by the wireless device 130.
25. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the s processing circuitry configured to perform one or more of the actions described herein as performed by the wireless device 130.
26. The communication system of embodiment 25, further including the UE.
27. The communication system of embodiment 26, wherein the cellular network further includes a base station configured to communicate with the UE.
28. The communication system of embodiment 26 or 27 wherein:
    the processing circuitry of the host computer is configured to execute a host application, thereby providing the user data; and
    the UE's processing circuitry is configured to execute a client application associated with the host application.
31. A method implemented in a user equipment (UE), comprising one or more of the actions described herein as performed by the wireless device 130.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the wireless device 130.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein.
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the wireless device 130.

56. The method of embodiment 55, further comprising:
UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the LIE is configured to communicate with the base station.

68. The communication system of embodiment 67. wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:
at the host computer, receiving, from the base station, user data originating from a transmission which the base station has received from the UE. wherein the LIE performs one or more of the actions described herein as performed by the wireless device 130.

76. The method of embodiment 75, further comprising:
at the base station, receiving be user data from the LIF 77. The method of embodiment 76, further comprising:
at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s),
3GPP 3rd Generation Partnership Project
5G 5th Generation
DL Downlink
eNB E-UTRAN NodeB
E-UTRA Evolved UTRA
E-UTRAN Evolved UTRAN
GERAN GSM EDGE Radio Access Network gNB Base station in NR
GSM Global System for Mobile communication
HSPA High Speed Packet Access
LTE Long-Term Evolution
OFDM Orthogonal Frequency Division Multiplexing
UE User Equipment
UL Uplink
UMTS Universal Mobile Telecommunication System
UTRA Universal Terrestrial Radio Access
UTRAN Universal Terrestrial Radio Access Network
WCDMA Wide CDMA
WLAN Wide Local Area Network
CCCH Common Control Channel
CE Control Element
C-RNTI Cell Radio Network Temporary Identifier
PDU Protocol Data Unit
SDU Service Data Unit
TA Time Alignment

What is claimed is:

1. A method performed by a wireless device operating in a wireless communications network, the method comprising:
providing a message to be sent to a network node operating in the wireless communications network, the message being a first scheduled message to be sent to the network node in a random access procedure, the message comprising a first indicator of a type of the message, the type of message having: a fixed size Service Data Unit (SDU) and a one byte header comprising the first indicator and lacking a second indicator of a length of a payload; and
initiating sending of the message to the network node;
wherein the type of message is a first type of message of a plurality of types of messages, the plurality of types of messages comprising a third type of message, the third type of message being fixed in size, and comprising one common subheader for a fixed size Service Data Unit (SDU) and at least one of:
a first Medium Access Control (MAC) control element being fixed in size, comprising a second field indicating a group of one or more logical channels, and a third field comprising first information on a status of a buffer related to the group of the one or more logical channels; and
a second MAC control element fixed in size, comprising a fourth field comprising second information on a power headroom.

2. A wireless device configured to operate in a wireless communications network, the wireless device comprising:
processing circuitry; and
a memory, the memory containing instructions executable by the processing circuitry, whereby the wireless device is operative to:
provide a message to be sent to a network node configured to operate in the wireless communications network, the message being a first scheduled message to be sent to the network node in a random access procedure, the message comprising a first indicator of a type of the message, the type of message having a fixed size Service Data Unit (SDU) and a one byte header comprising the first indicator and lacking a second indicator of a length of a payload; and
initiate sending of the message to the network node;
wherein the type of message is a first type of message of a plurality of types of messages, the plurality of types of messages comprising a third type of message, the third type of message being fixed in size, and comprising one common subheader for a fixed size Service Data Unit (SDU) and at least one of:
a first Medium Access Control (MAC) control element being fixed in size, comprising a second field indicating a group of one or more logical channels, and a third field comprising first information on a status of a buffer related to the group of the one or more logical channels; and
a second MAC control element fixed in size, comprising a fourth field comprising second information on a power headroom.

3. The wireless device according to claim 2, wherein the header is a Medium Access Control (MAC) subheader, and wherein the first indicator is a value in a Logical Channel Identity (LCID) field in the MAC subheader.

4. The wireless device according to claim 3, wherein the value in the LCID field is "110110".

5. The wireless device according to claim 2, wherein the plurality of types of messages further comprises a second type of message, the second type of message having a variable size SDU and the second indicator of the length of the payload.

6. The wireless device according to claim 2, wherein the first indicator is a first value in a first field in a Medium Access Control (MAC) subheader, the MAC subheader further comprising a Logical Channel Identity (LCID) field, the LCID field comprising a second value.

7. The wireless device according to claim 2, wherein the first indicator is a fourth value in a Logical Channel Identity (LCID) field in a MAC subheader.

8. The wireless device according to claim 2, wherein execution of the instructions causes the wireless device to:
select the type of the message to be sent to the network node, based on at least one of: a size of a grant received from the network node to transmit the message; a preamble sent by the wireless device; and a grouping of the preamble.

9. The wireless device according to claim 2, wherein the wireless device is configured to be uplink synchronized, or connected, with the network node, and wherein the first type of message further comprises two fields comprising an identifier of the wireless device in a cell, wherein the wireless device is configured to be served by the network node.

10. The wireless device according to claim 2, wherein any of the first type of message and the third type of message is a Msg3 message.

11. The wireless device according to claim 2, wherein the SDU is a Medium Access Control (MAC) SDU for Common Control Channel (CCCH).

12. The wireless device according to claim 2, wherein the wireless communications network is configured to operate on New Radio (NR).

13. A network node configured to operate in a wireless communications network, the network node comprising:
processing circuitry; and
a memory, the memory containing instructions executable by the processing circuitry, whereby the network node is operative to:
receive a message from a wireless device configured to operate in the wireless communications network, the message being a first scheduled message received by the network node in a random access procedure, the message comprising a first indicator of a type of the message, the type of message having: a fixed size Service Data Unit (SDU) and a one byte header comprising the first indicator and lacking a second indicator of a length of a payload; and initiate processing of the message, based on the first indicator;

wherein the type of message is a first type of message of a plurality of types of messages, the plurality of types of messages comprising a third type of message, the third type of message being fixed in size, and comprising one common subheader for a fixed size SDU and at least one of:

a first Medium Access Control (MAC) control element being fixed in size, comprising a second field indicating a group of one or more logical channels, and a third field comprising first information on a status of a buffer related to the group of the one or more logical channels; and a second MAC control element fixed in size, comprising a fourth field comprising second information on a power headroom.

14. The network node according to claim 13, wherein the header is a Medium Access Control (MAC) subheader, and wherein the first indicator is a value in a Logical Channel Identity (LCID) field in the MAC subheader.

15. The network node according to claim 14, wherein the value of the LCID field is "110110".

16. The network node according to claim 13, wherein the plurality of types of messages further comprises a second type of message, the second type of message having a variable size SDU and the second indicator of the length of the payload.

17. The network node according to claim 13, wherein the first indicator is a first value in a first field in a Medium Access Control (MAC) subheader, the MAC subheader further comprising a Logical Channel Identity (LCID) field, the LCID field comprising a second value.

18. The network node according to claim 13, wherein the first indicator is a fourth value in a Logical Channel Identity (LCID) field in a MAC subheader.

* * * * *

UNITED STATES PATENT AND TRADEMARK OFFICE
CERTIFICATE OF CORRECTION

PATENT NO. : 11,516,854 B2
APPLICATION NO. : 17/154212
DATED : November 29, 2022
INVENTOR(S) : Bergquist et al.

It is certified that error appears in the above-identified patent and that said Letters Patent is hereby corrected as shown below:

In the Specification

In Column 1, Line 8, delete "2019," and insert -- 2019, now Pat. No. 10,945,291, --, therefor.

In Column 1, Line 9, delete "PCT/SE201.8/051358" and insert -- PCT/SE2018/051358 --, therefor.

In Column 2, Line 34, delete "Information, packets," and insert -- Information, e.g., packets, --, therefor.

In Column 2, Line 56, delete "Logical Channel Identifier field (LCID)," and insert -- Logical Channel Identity (LCID) field, --, therefor.

In Column 2, Line 59, delete "v1.5.0.0," and insert -- v15.0.0, --, therefor.

In Column 2, Line 66, delete "R/FILCID/L," and insert -- R/F/LCID/L, --, therefor.

In Column 3, Line 3, delete "8-hit" and insert -- 8-bit --, therefor.

In Column 3, Line 7, delete "LCD" and insert -- LCID --, therefor.

In Column 3, Lines 50-52, delete "Contention Based Random Access procedure (CBRA) or Contention Free Random Access procedure (CFRA)." and insert -- Contention Based Random Access (CBRA) procedure or Contention Free Random Access (CFRA) procedure. --, therefor.

In Column 4, Line 11, delete "AI-11801," and insert -- AH1801, --, therefor.

In Column 4, Line 34, delete "(LOD)," and insert -- (LCID), --, therefor.

In Column 4, Line 50, delete "panel h)" and insert -- panel b), --, therefor.

Signed and Sealed this
Sixteenth Day of April, 2024

Katherine Kelly Vidal
*Director of the United States Patent and Trademark Office*

CERTIFICATE OF CORRECTION (continued)
U.S. Pat. No. 11,516,854 B2

In Column 5, Line 43, delete "and h)" and insert -- and b) --, therefor.

In Column 6, Line 5, delete "and h)" and insert -- and b) --, therefor.

In Column 6, Line 49, delete "v1.5.0.0" and insert -- v15.0.0 --, therefor.

In Column 6, Line 50, delete "RIF/LCID/L" and insert -- R/F/LCID/L --, therefor.

In Column 6, Lines 53-54, delete "payload SDU" and insert -- payload CCCII SDU --, therefor.

In Column 7, Line 6, delete "Magi" and insert -- Msg3 --, therefor.

In Column 8, Line 32, delete "his" and insert -- this --, therefor.

In Column 8, Line 44, delete "(MD)," and insert -- (FDD), --, therefor.

In Column 9, Line 3, delete "pray be of different classes, such as, macro" and insert -- may be of different classes, such as, e.g., macro --, therefor.

In Column 9, Line 16, delete "5G LT," and insert -- 5G UE, --, therefor.

In Column 9, Line 27, delete "modern," and insert -- modem, --, therefor.

In Column 9, Lines 44-45, delete "step, etc. to" and insert -- step, etc. are to --, therefor.

In Column 10, Line 2, delete "example" and insert -- exemplary --, therefor.

In Column 10, Line 29, delete "sonic non-limiting examples facilitate to the embodiments" and insert -- some non-limiting examples to facilitate the embodiments --, therefor.

In Column 11, Line 44, delete "LCD" and insert -- LCID --, therefor.

In Column 11, Line 56, delete "3GGP" and insert -- 3GPP --, therefor.

In Column 11, Line 63, delete "CCGH" and insert -- CCCH --, therefor.

In Column 12, Line 49, delete "CCCII" and insert -- CCCH --, therefor.

In Column 13, Line 34, delete "LCDI" and insert -- LCID --, therefor.

In Column 13, Line 38, delete "LCDI" and insert -- LCID --, therefor.

In Column 13, Line 54, delete "46 hit" and insert -- 46 bit --, therefor.

In Column 14, Lines 40-41, delete "FIG. 6.1.3,8-1 in TS 38,321-v15.0.0, Jan. 4, 2018" and insert -- FIG. 6.1.3.8-1 in TS 38.321-v15.0.0, Jan. 4, 2018, --, therefor.

CERTIFICATE OF CORRECTION (continued)
U.S. Pat. No. 11,516,854 B2

In Column 14, Line 54, delete "R filed" and insert -- R field --, therefor.

In Column 14, Line 66, delete "sub eater" and insert -- subheader --, therefor.

In Column 15, Line 34, delete "the grid" and insert -- the third --, therefor.

In Column 15, Line 39, delete "Magi" and insert -- Msg3 --, therefor.

In Column 15, Line 45, delete "CRC 704." and insert -- CRC 710. --, therefor.

In Column 15, Line 67, delete "in size, the" and insert -- in size, e.g., the --, therefor.

In Column 17, Line 55, delete "sane" and insert -- same --, therefor.

In Column 18, Line 33, delete "and h)" and insert -- and b) --, therefor.

In Column 19, Line 10, delete "118," and insert -- 1/8, --, therefor.

In Column 19, Line 42, delete "fixed sire" and insert -- fixed size --, therefor.

In Column 20, Line 24, delete "Action 603, by" and insert -- Action 603, e.g., by --, therefor.

In Column 22, Line 62, delete "702, by" and insert -- 702, e.g., by --, therefor.

In Column 23, Line 42, delete "herein" and insert -- wherein --, therefor.

In Column 24, Line 27, delete "firmware, stored" and insert -- firmware, e.g., stored --, therefor.

In Column 25, Line 18, delete "network erode" and insert -- network node --, therefor.

Figure 13:
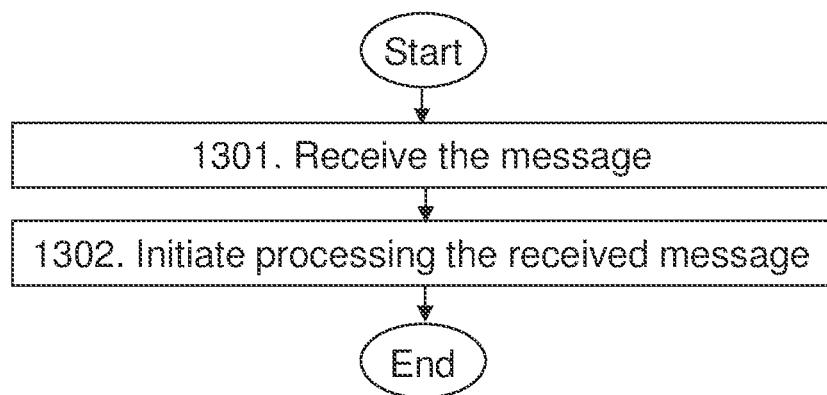
FIG. 13 is a flowchart depicting a method in a network node, according to embodiments herein.

In Column 25, Line 23, delete "e.g., FIG. 13," and insert -- e.g., in FIG. 13, --, therefor.

In Column 25, Line 34, delete "network mode" and insert -- network node --, therefor.

In Column 26, Line 12, delete "SIMI" and insert -- SDU --, therefor.

In Column 27, Line 49, delete "LOD" and insert -- LCID --, therefor.

In Column 27, Line 51, delete "UIF)" and insert -- LCID --, therefor.

In Column 28, Line 37, delete "pray" and insert -- may --, therefor.

In Column 33, Line 39, delete "in that" and insert -- such that --, therefor.

In Column 34, Line 65, delete "substep" and insert -- step --, therefor.

CERTIFICATE OF CORRECTION (continued)
U.S. Pat. No. 11,516,854 B2

In Column 39, Line 8, delete "UMTS Universal Mobile Telecommunication System" and insert -- UMTS Universal Mobile Telecommunications System --, therefor.

In Column 39, Line 11, delete "WCDMA Wide CDMA" and insert -- WCDMA Wideband CDMA --, therefor.

In Column 39, Line 12, delete "WLAN Wide Local Area Network" and insert -- WLAN Wireless Local Area Network --, therefor.

In Column 39, Line 18, delete "TA Time Alignment" and insert -- TA Timing Advance --, therefor.